(12) United States Patent
Tanabe et al.

(10) Patent No.: US 11,354,031 B2
(45) Date of Patent: Jun. 7, 2022

(54) ELECTRONIC APPARATUS, COMPUTER-READABLE NON-TRANSITORY RECORDING MEDIUM, AND DISPLAY CONTROL METHOD FOR CONTROLLING A SCROLL SPEED OF A DISPLAY SCREEN

(71) Applicant: KYOCERA CORPORATION, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/521,482

(22) Filed: Jul. 24, 2019

(65) Prior Publication Data

US 2020/0034032 A1 Jan. 30, 2020

(30) Foreign Application Priority Data

Jul. 27, 2018 (JP) .............................. JP2018-141626

(51) Int. Cl.
*G06F 3/0488* (2022.01)
*G06F 3/0485* (2022.01)
(Continued)

(52) U.S. Cl.
CPC .......... *G06F 3/04883* (2013.01); *G06F 3/017* (2013.01); *G06F 3/0485* (2013.01);
(Continued)

(58) Field of Classification Search
CPC ............... G06F 3/04883; G06F 3/0485; G06F 3/04845; G06F 3/017; G06F 2203/04105;
(Continued)

(56) References Cited

U.S. PATENT DOCUMENTS 5,289,168 A * 2/1994 Freeman ............... G06F 3/0485
345/672
6,408,087 B1 * 6/2002 Kramer ............... G06F 3/03547
345/156

(Continued)

FOREIGN PATENT DOCUMENTS

JP 2009-211244 A 9/2009
JP 2012168890 A 9/2012
(Continued)

OTHER PUBLICATIONS

Notice of Co-Pending U.S. Appl. No. 16/522,087.

*Primary Examiner* — David D Davis
(74) *Attorney, Agent, or Firm* — Duane Morris LLP

(57) ABSTRACT

An electronic apparatus comprises a display surface, a first sensor, a second sensor, and at least one processor. The first sensor comprises a detection object surface, and detects a fingerprint of a finger touching the detection object surface. The second sensor detects a pressure on the detection object surface. The at least one processor specifies an operation of a finger performed on the detection object surface based on a first detection result in the first sensor. The at least one processor specifies a pressure on the detection object surface based on a second detection result in the second sensor. The at least one processor controls a display of a first screen in the display surface based on the specified operation and pressure.

16 Claims, 36 Drawing Sheets

(51) Int. Cl.
*G06F 3/0484* (2022.01)
*G06K 9/00* (2022.01)
*G06F 3/01* (2006.01)
*G06F 3/044* (2006.01)
*G06F 3/04883* (2022.01)
*G06F 3/04845* (2022.01)
*G06V 40/13* (2022.01)

(52) U.S. Cl.
CPC ..... *G06F 3/04845* (2013.01); *G06K 9/00013* (2013.01); *G06V 40/13* (2022.01); *G06F 3/044* (2013.01); *G06F 2203/04105* (2013.01)

(58) Field of Classification Search
CPC ...... G06F 3/044; G06F 3/041; G06F 3/03547; G06F 2203/04806; G06F 21/32; G06K 9/00013; G06K 9/00087
See application file for complete search history.

(56) References Cited

U.S. PATENT DOCUMENTS

| | | | |
|---|---|---|---|
| 2007/0002018 A1* | 1/2007 | Mori | G06F 1/1626 345/158 |
| 2013/0201155 A1* | 8/2013 | Wu | G06F 3/03547 345/174 |
| 2013/0293454 A1 | 11/2013 | Jeon | |
| 2014/0253479 A1 | 9/2014 | Sato | |
| 2014/0359438 A1 | 12/2014 | Matsuki | |
| 2015/0074615 A1* | 3/2015 | Han | G06F 3/0481 715/863 |
| 2016/0171281 A1* | 6/2016 | Park | G06F 3/03547 382/124 |
| 2018/0046341 A1* | 2/2018 | Lee | G06F 3/04817 |
| 2018/0114046 A1* | 4/2018 | Shimada | G06F 3/0482 |
| 2018/0367656 A1* | 12/2018 | Kim | G06F 21/32 |
| 2019/0278896 A1 | 9/2019 | Ichikawa | |
| 2019/0286322 A1 | 9/2019 | Yamano | |

FOREIGN PATENT DOCUMENTS

| | | | | |
|---|---|---|---|---|
| JP | 2013070303 A | 4/2013 | | |
| JP | 2013-114645 A | 6/2013 | | |
| JP | 2013-235588 A | 11/2013 | | |
| JP | 2014-197164 A | 10/2014 | | |
| JP | 2014-222379 A | 11/2014 | | |
| JP | 2015-194997 A | 11/2015 | | |
| JP | 2017-537416 A | 12/2017 | | |
| KR | 20170086538 A | * | 7/2017 | ........... G06F 3/0481 |
| WO | 2011/067845 A1 | 6/2011 | | |
| WO | 2016/065482 A1 | 5/2016 | | |
| WO | 2018/037738 A1 | 3/2018 | | |
| WO | 2018/079001 A1 | 5/2018 | | |

* cited by examiner

F I G. 1
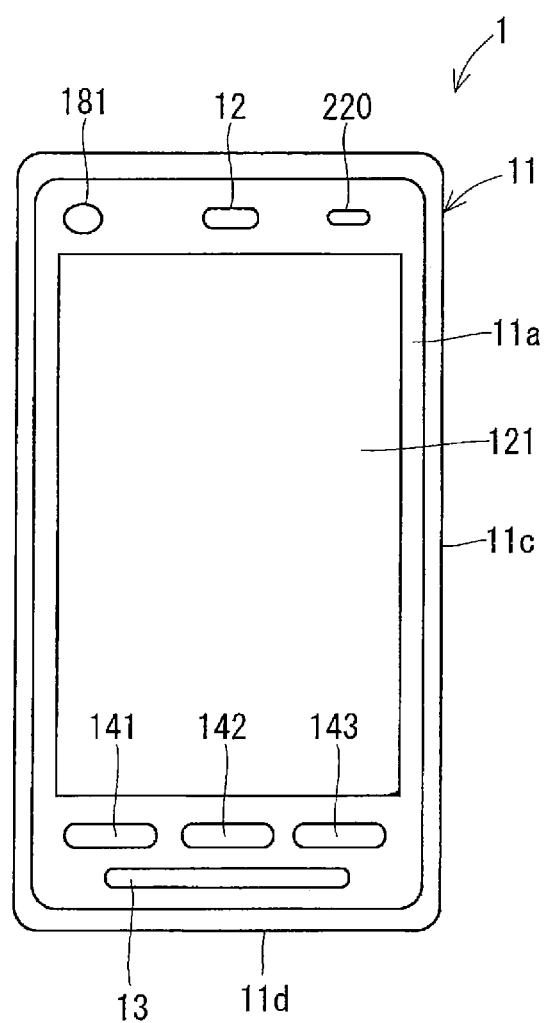

F I G. 2
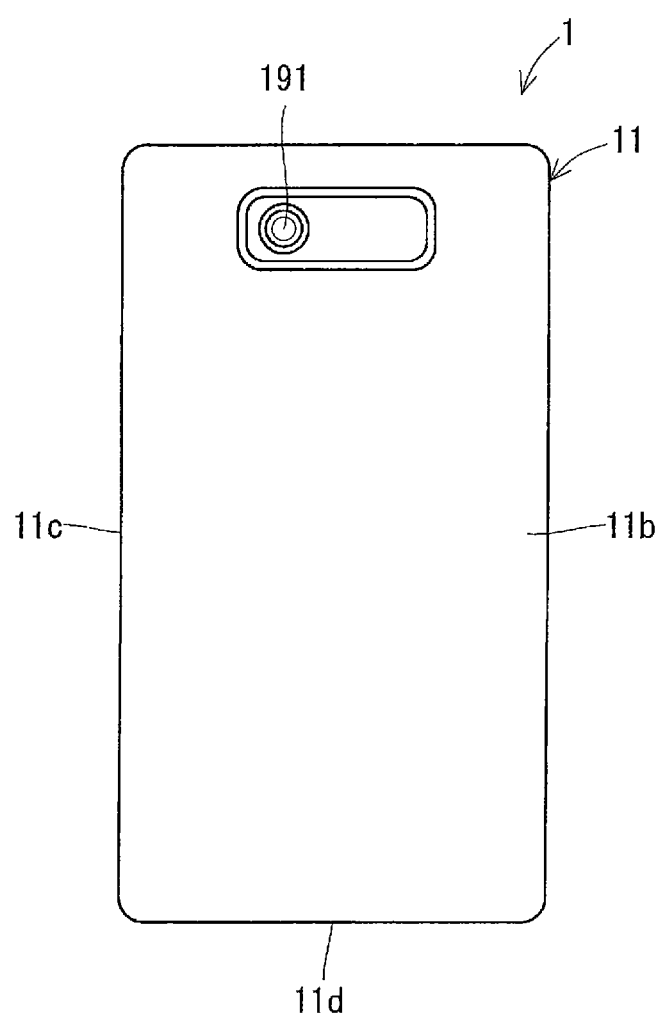

F I G. 5
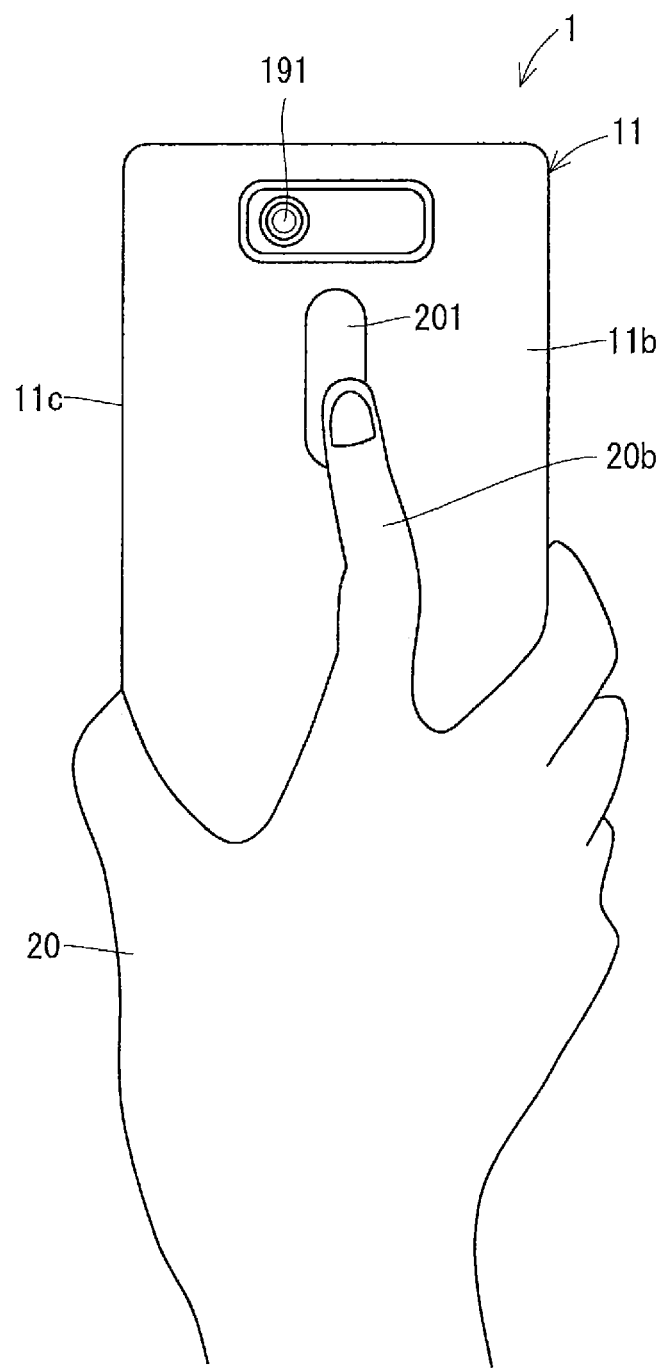

F I G. 8
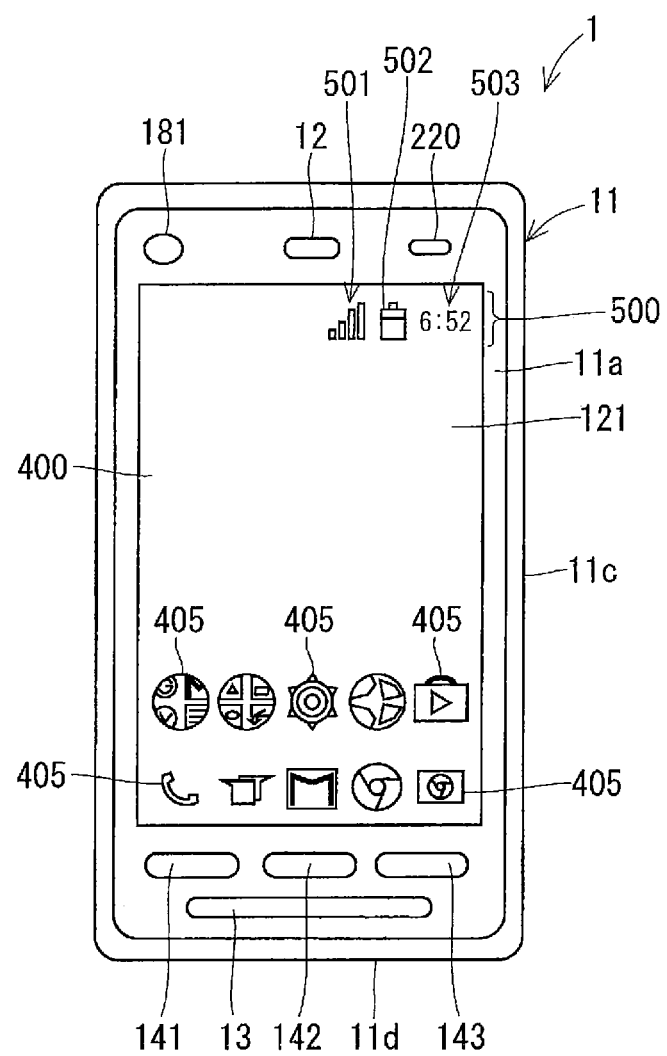

F I G. 2 0
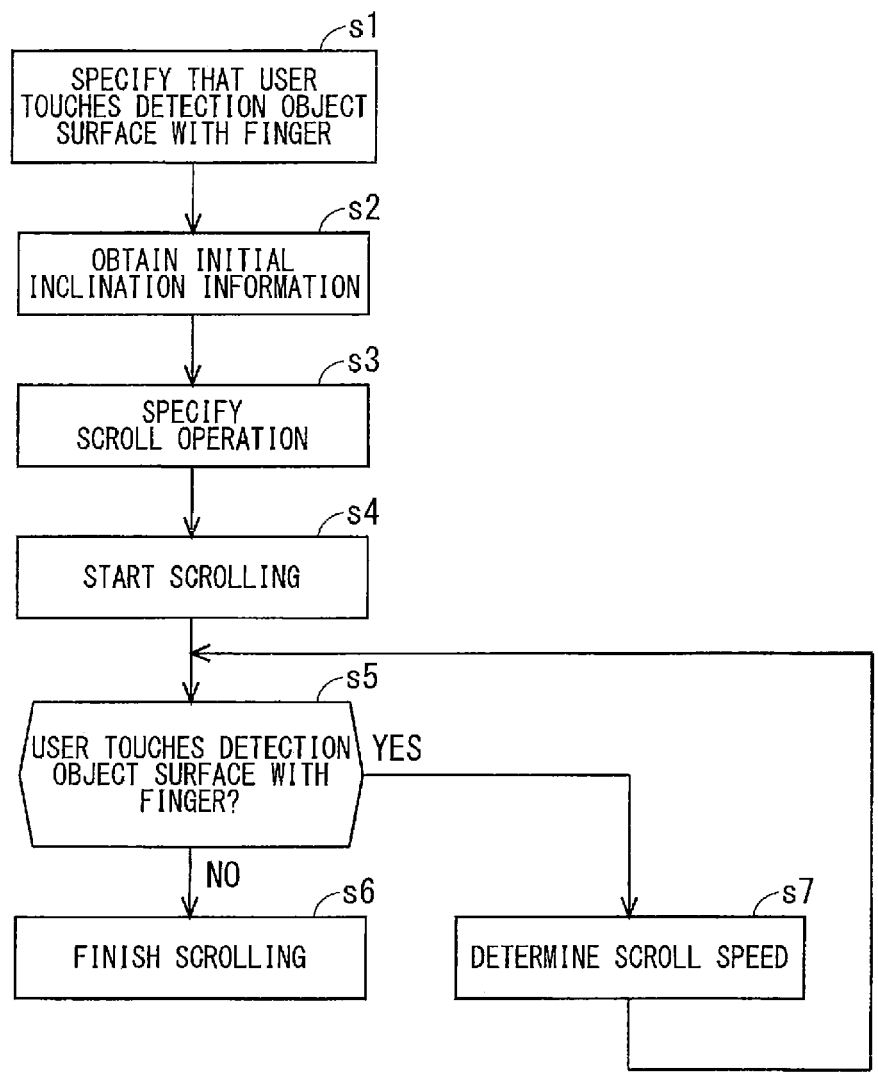

F I G. 2 2
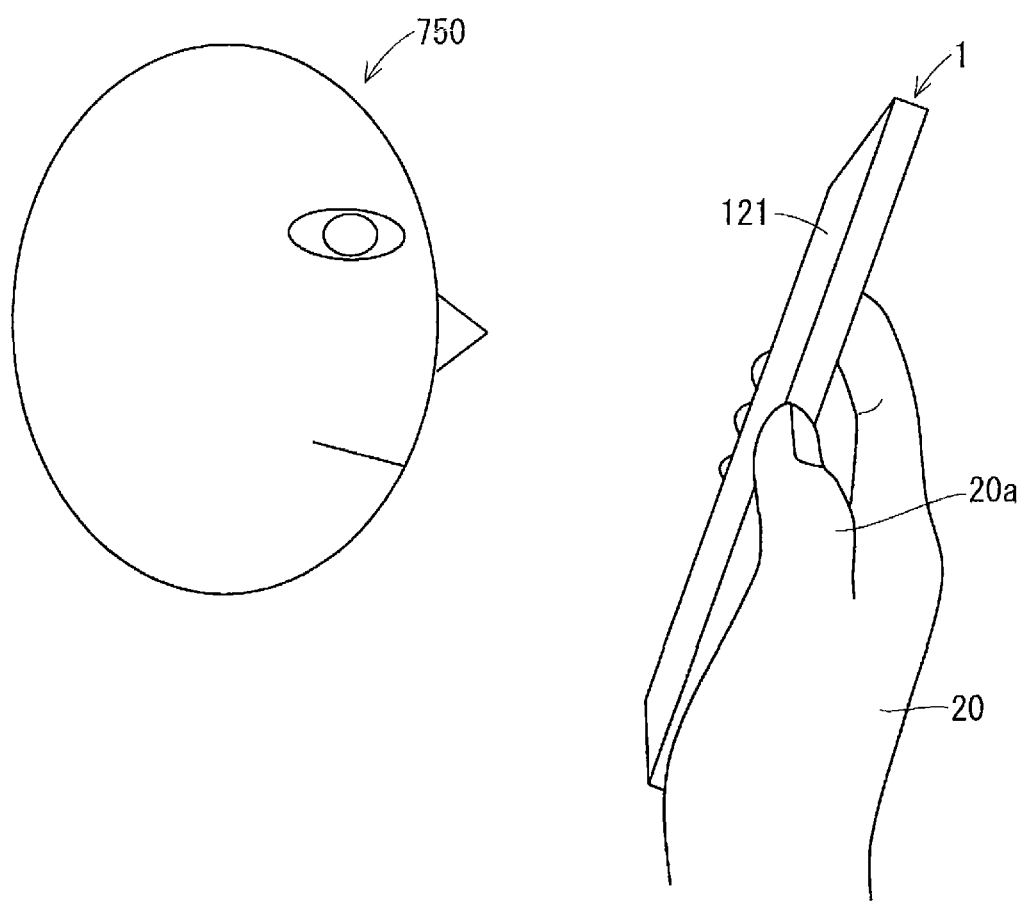

F I G. 2 4
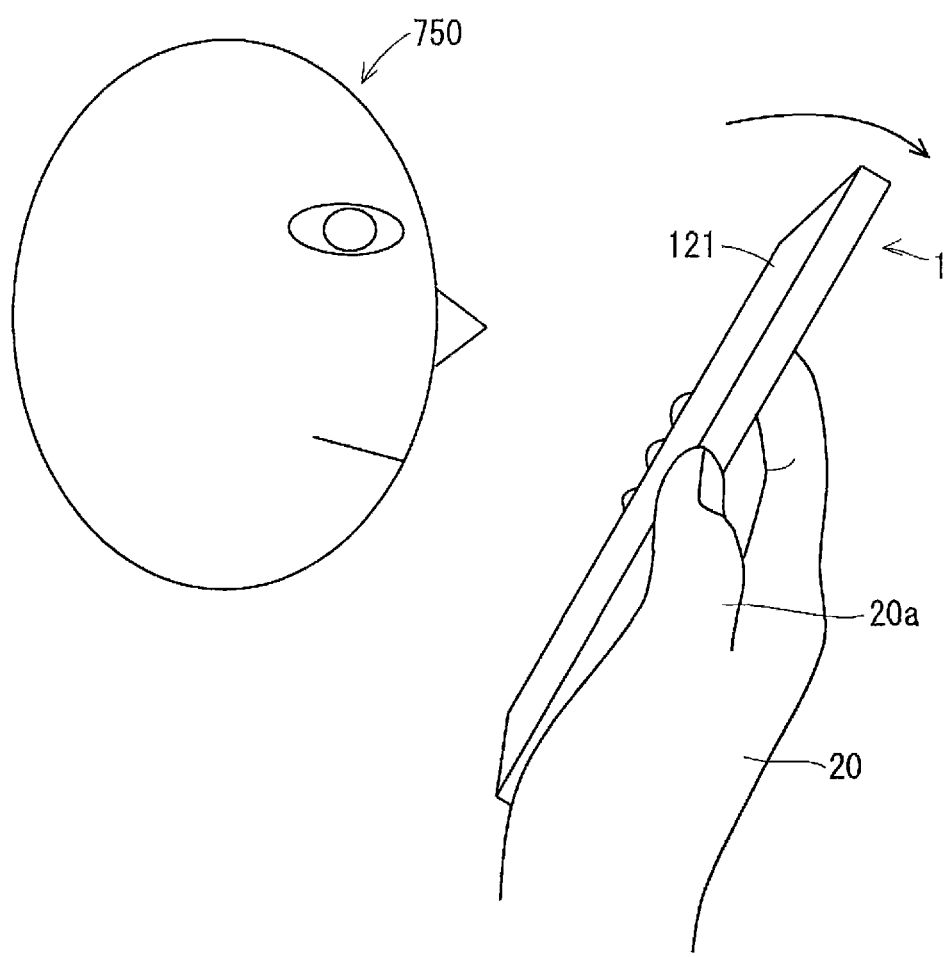

F I G. 2 5
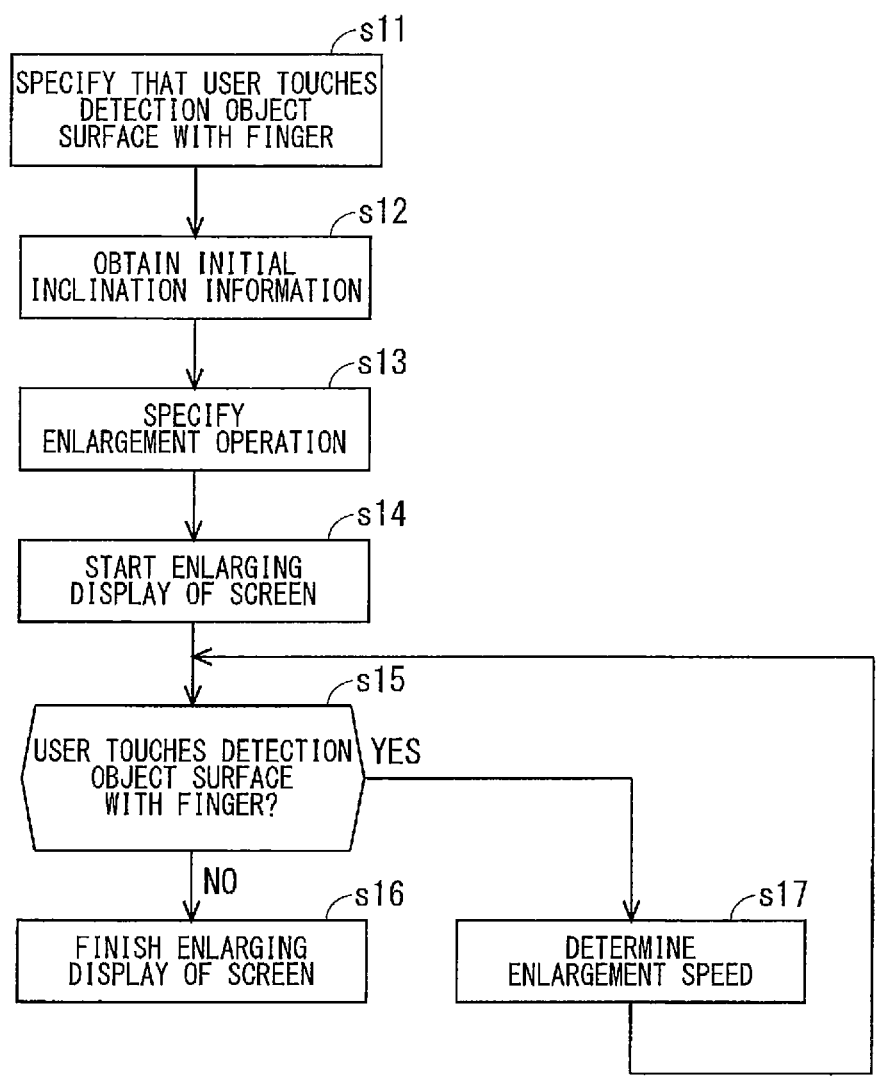

F I G. 2 8
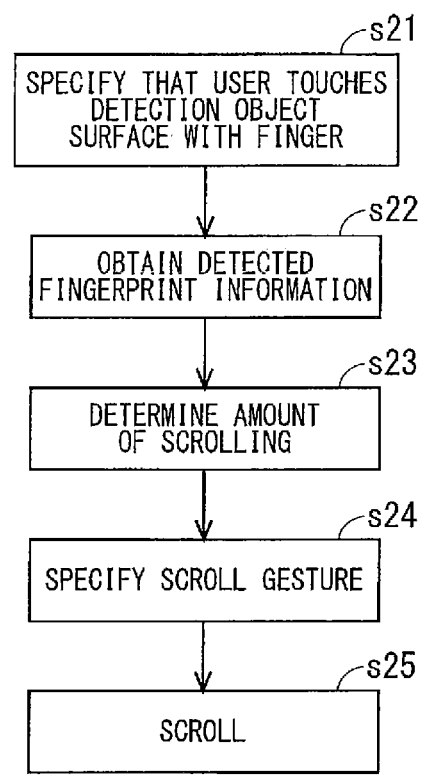

F I G. 3 7
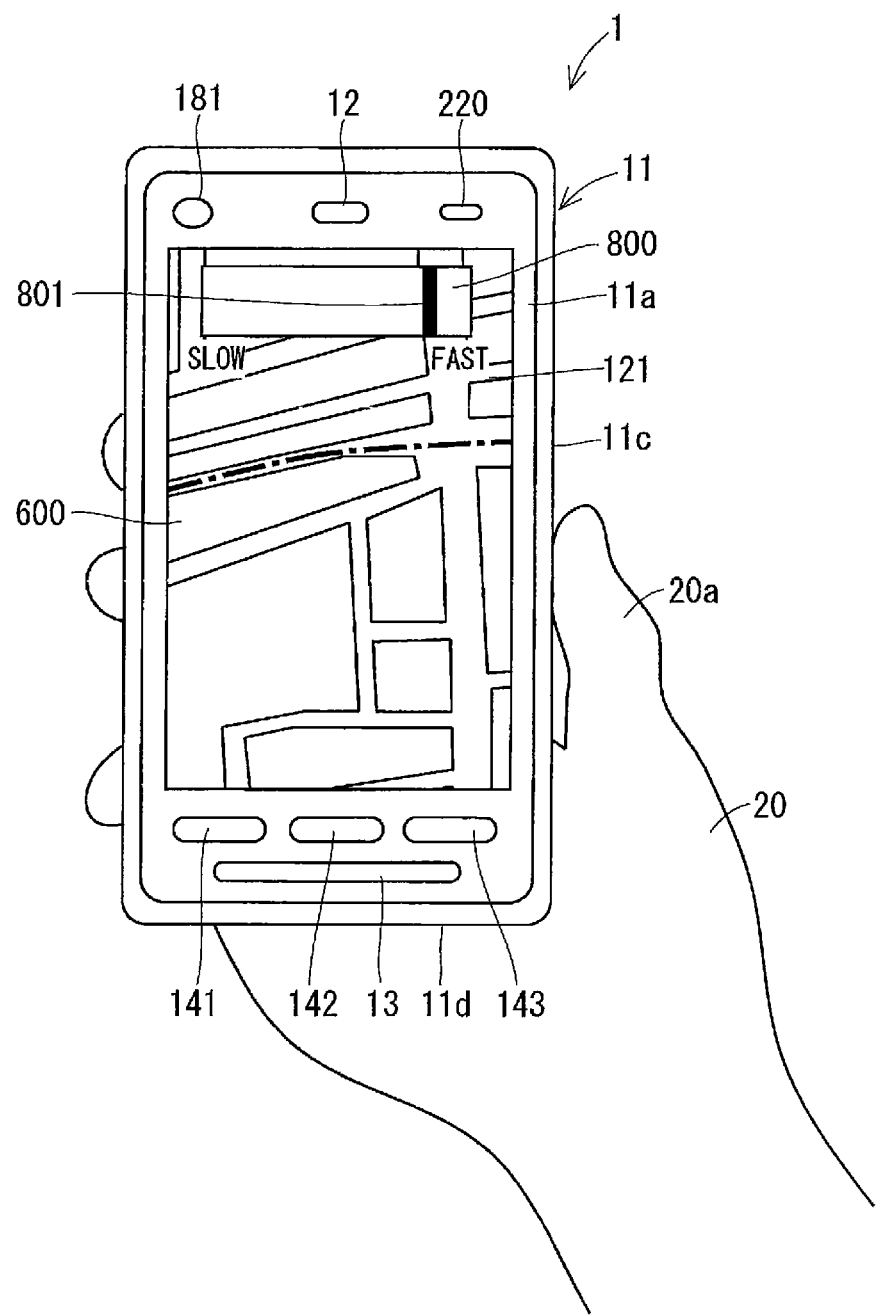

ELECTRONIC APPARATUS, COMPUTER-READABLE NON-TRANSITORY RECORDING MEDIUM, AND DISPLAY CONTROL METHOD FOR CONTROLLING A SCROLL SPEED OF A DISPLAY SCREEN

CROSS-REFERENCE TO RELATED APPLICATION

The present application claims priority under 35 U.S.C. § 119 to Japanese Patent Application No. 2018-141626, filed on Jul. 27, 2018, entitled "ELECTRONIC APPARATUS, CONTROL PROGRAM, AND DISPLAY CONTROL METHOD". The content of which is incorporated by reference herein in its entirety.

FIELD

The present disclosure relates to electronic apparatuses.

BACKGROUND

Various techniques relating to electronic apparatuses are proposed.

SUMMARY

An electronic apparatus, computer-readable non-transitory recording medium, and display control method are disclosed. In one embodiment, an electronic apparatus comprises a display surface, a first sensor, a second sensor, and at least one processor. The first sensor with a detection object surface detects a fingerprint of a finger touching the detection object surface. The second sensor detects a pressure on the detection object surface. The at least one processor specifies an operation performed by a finger on the detection object surface based on a first detection result in the first sensor. The at least one processor specifies the pressure based on a second detection result in the second sensor. The at least one processor controls a display of a first screen in the display surface based on the operation and the pressure which are specified.

In one embodiment, a non-transitory computer readable storage medium comprises a control program for controlling an electronic apparatus. The control program makes the electronic apparatus specify an operation of a finger performed on a detection object surface based on a first detection result in a first sensor which detects a fingerprint of a finger touching the detection object surface included in the electronic apparatus. The control program makes the electronic apparatus specify a pressure on the detection object surface based on a second detection result in a second sensor which detects the pressure. The control program makes the electronic apparatus control a display of a screen which is a display surface included in the electronic apparatus based on the operation and the pressure which are specified.

In one embodiment, a display control method comprises specifying an operation of a finger performed on a detection object surface based on a first detection result in a first sensor which detects a fingerprint of a finger touching the detection object surface included in an electronic apparatus. The display control method comprises specifying a pressure on the detection object surface based on a second detection result in a second sensor which detects the pressure. The display control method comprises controlling a display of a screen which is a display surface included in the electronic apparatus based on the operation and the pressure which are specified.

BRIEF DESCRIPTION OF THE DRAWINGS

FIG. 1 illustrates a front view showing one example of an external appearance of an electronic apparatus.
FIG. 2 illustrates a back view showing one example of the external appearance of the electronic apparatus.
FIG. 5 illustrates a drawing showing one example of a user operating the electronic apparatus.
FIG. 8 illustrates a drawing showing one example of a display of the electronic apparatus.
FIG. 20 illustrates a flow chart showing one example of an operation of the electronic apparatus.
FIG. 22 illustrates a drawing showing one example of a user operating the electronic apparatus.
FIG. 24 illustrates a drawing showing one example of a user operating the electronic apparatus.
FIG. 25 illustrates a flow chart showing one example of an operation of the electronic apparatus.
FIG. 28 illustrates a flow chart showing one example of an operation of the electronic apparatus.

FIG. 37 illustrates a drawing showing one example of a display of the electronic apparatus.

DETAILED DESCRIPTION

<One Example of External Appearance of Electronic Apparatus>

Figure 3:
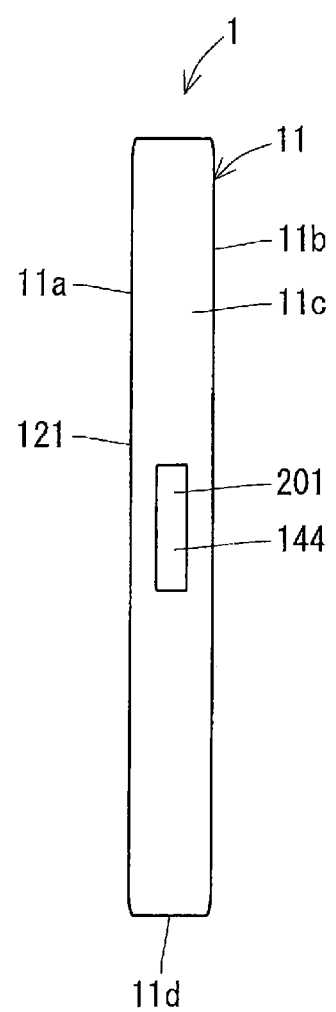
FIG. 3 illustrates a side view showing one example of the external appearance of the electronic apparatus.

FIGS. 1 to 3 are a front view, a back view, and a side view showing one example of an external appearance of an electronic apparatus 1, respectively. The electronic apparatus 1 is, for example, a mobile phone such as a smartphone. As shown in FIGS. 1 to 3, the electronic apparatus 1 comprises an apparatus case 11 having a plate shape substantially rectangular in a plan view. The apparatus case 11 constitutes an exterior of the electronic apparatus 1.

A display surface 121, in which various types of information such as characters, symbols, and graphics are displayed, is located in a front surface 11a of the apparatus case 11, in other words, a front surface of the electronic apparatus 1. A touch panel 130, which will be described below, is located in a back surface side of the display surface 121. Accordingly, a user can input various types of information to the electronic apparatus 1 by operating the display surface 121 in the front surface of the electronic apparatus 1 with his/her finger, for example. The user can also input the various types of information to the electronic apparatus 1 by operating the display surface 121 with a pen for the touch panel such as a stylus pen, for example, instead of an operator such as his/her finger.

A receiver hole 12 and a proximity sensor 220 are located in an upper end of the front surface 11a of the apparatus case 11. A lens 181 included in a first camera 180, which will be described below, can be visually recognized from the upper end of the front surface 11a of the apparatus case 11. A speaker hole 13 is located in a lower end of the front surface 11a of the apparatus case 11. As illustrated in FIG. 2, a lens 191 included in a second camera 190, which will be described below, can be visually recognized from an upper end of a rear surface 11b of the apparatus case 11, in other words, the upper end of a rear surface of the electronic apparatus 1. A microphone hole is located in a side surface 11d in a lower side of the apparatus case 11.

Figure 6:
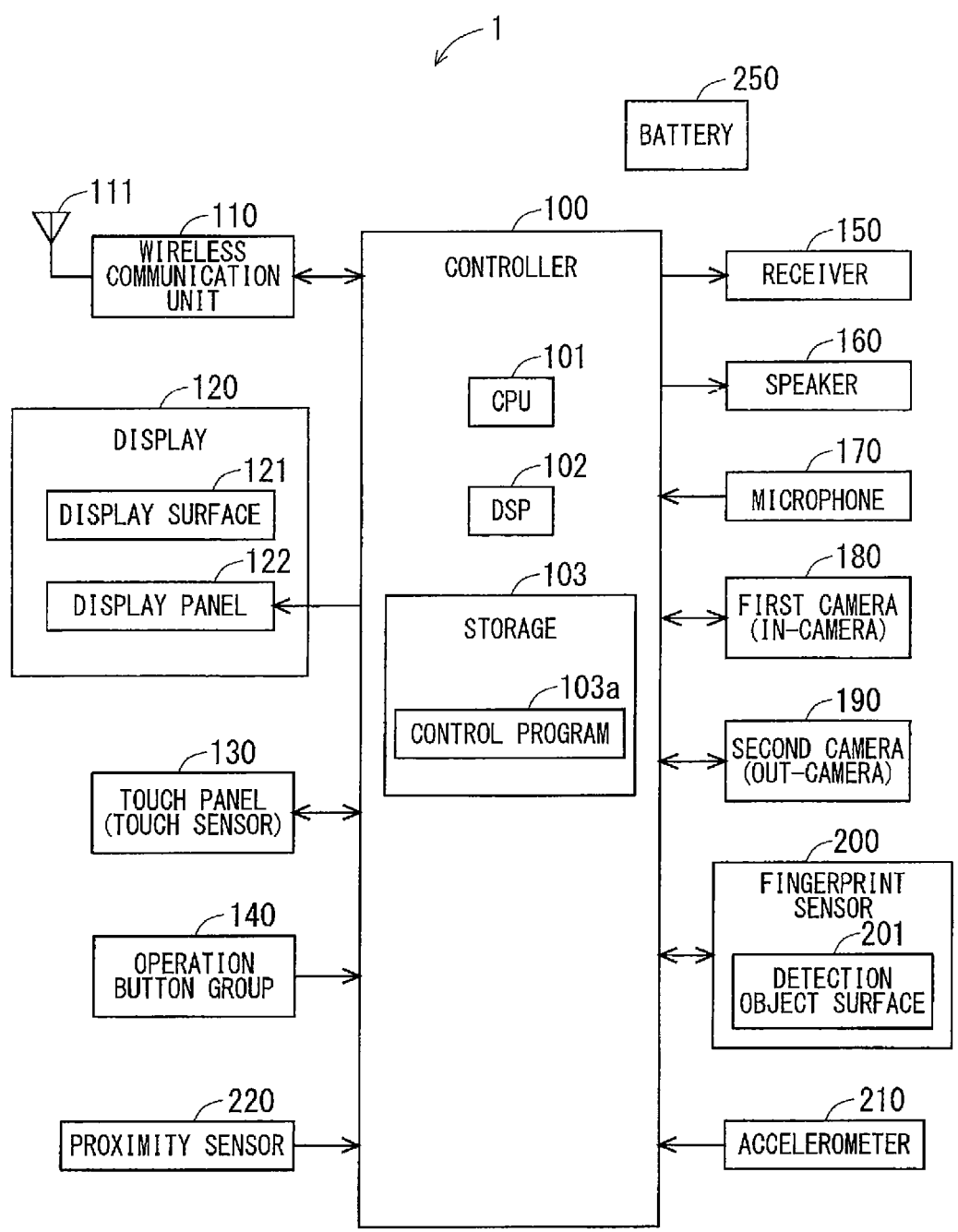
FIG. 6 is a block diagram showing one example of a configuration of the electronic apparatus.

The electronic apparatus 1 comprises an operation button group 140 including a plurality of operation buttons (refer to FIG. 6). Each operation button is a hardware button, for example, and is located in a surface of the apparatus case 11. Each operation button is a press button, for example. The operation button group 140 includes operation buttons 141 to 143 located in the lower end of the front surface 11a of the apparatus case 11.

The operation button 141 functions as a back button, for example. The back button is an operation button for switching the display in the display surface 121 to the immediately preceding display. The user presses the operation button 141 to switch the display in the display surface 121 to the immediately preceding display.

The operation button 142 functions as a home button, for example. The home button is an operation button for displaying the home screen in the display surface 121. When the user presses the operation button 142, for example, the display surface 121 displays the home screen.

The operation button 143 functions as a history button, for example. The history button is an operation button to display a history of an application executed by the electronic apparatus 1 in the display surface 121. When the user presses the operation button 143, the display surface 121 displays a history of the applications executed by the electronic apparatus 1.

The operation button group 140 includes a power source button 144. As illustrated in FIG. 3, the power source button 144 is located in a side surface 11c on a right side of the apparatus case 11. In the present specification, the right side means a right side in a case of viewing the display surface 121 unless otherwise noted. A left side means a left side in the case of viewing the display surface 121 unless otherwise noted. The operation button group 140 includes an operation button other than the operation buttons 141 to 143 and the power source button 141. For example, the operation button group 140 may include a volume button.

In the present example, an exposed surface of the power source button 144 exposed from the apparatus case 11 is a detection object surface 201 of a fingerprint sensor 200 (refer to FIG. 6). The detection object surface 201 is exposed from the surface of the electronic apparatus 1. The fingerprint sensor 200 can detect a fingerprint of the user's finger touching the detection object surface 201. The detection object surface 201 is also considered as a detection object region 201.

Figure 4:
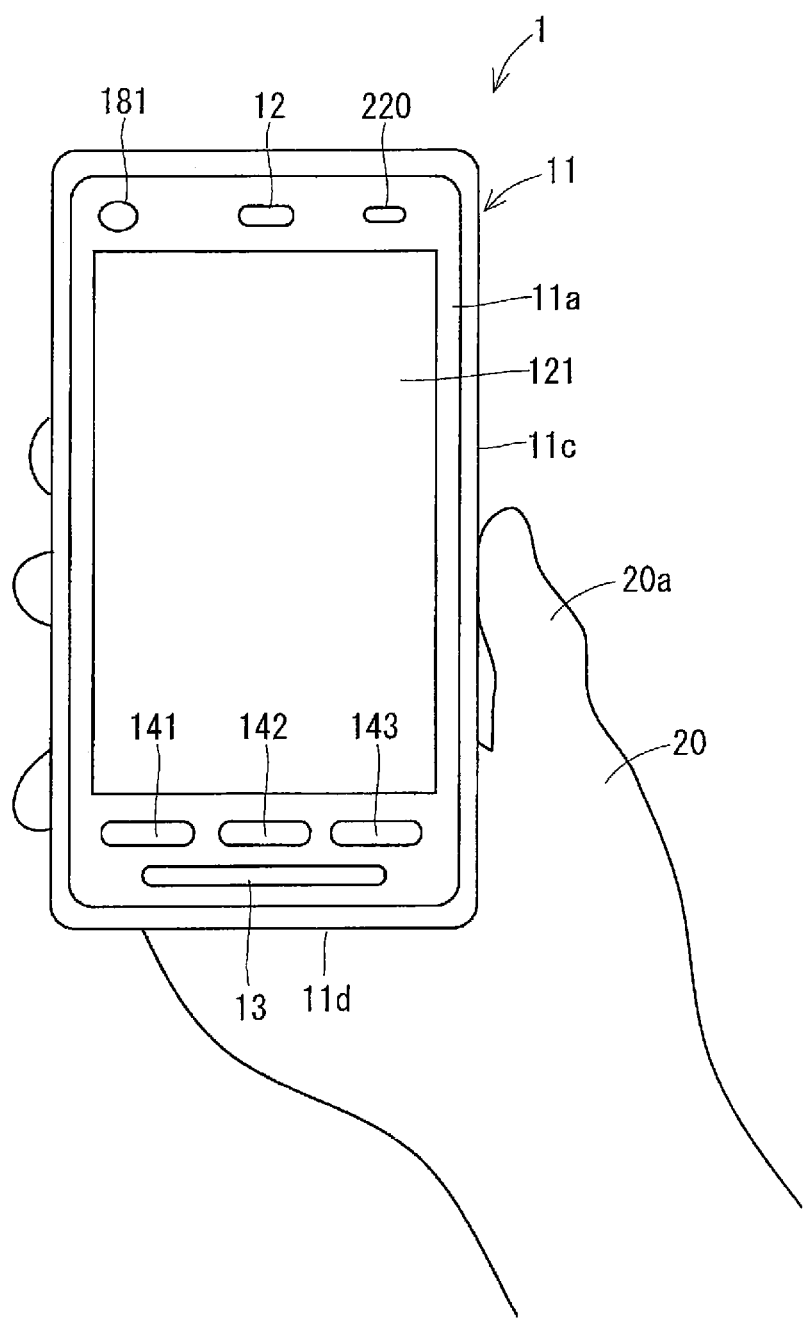
FIG. 4 illustrates a drawing showing one example of a user operating the electronic apparatus.

A user of the electronic apparatus 1 can touch the detection object surface 201 with a finger of a hand in which the electronic apparatus 1 is held in a state of holding the electronic apparatus 1 in one hand. FIG. 4 is a drawing showing one example thereof. FIG. 4 illustrates the user touching the detection object surface 201 with a thumb 20a of a right hand 20 in a state of holding the electronic apparatus 1 in the right hand 20.

The detection object surface 201 may be located in a region other than the exposed surface of the power source button 144 in the surface of the electronic apparatus 1. For example, the detection object surface 201 may be located in the rear surface 11b of the apparatus case 11 as illustrated in FIG. 5. In the case in FIG. 5, the user can touch the detection object surface 201 with a second finger 20b of the right hand 20 in the state of holding the electronic apparatus 1 in the right hand 20, for example. The detection object surface 201 may be located in the front surface 11a of the apparatus case 11.

<One Example of Electrical Configuration of Electronic Apparatus>

FIG. 6 is a block diagram mainly showing one example of an electrical configuration of the electronic apparatus 1. As illustrated in FIG. 6, the electronic apparatus 1 comprises a controller 100, a wireless communication unit 110, a display 120, the touch panel 130, the operation button group 140, and the proximity sensor 220. The electronic apparatus 1 further comprises a receiver 150, a speaker 160, a microphone 170, the first camera 180, the second camera 190, the fingerprint sensor 200, an accelerometer 210, and a battery 250. The apparatus case 11 houses these components included in the electronic apparatus 1.

The controller 100 controls the other components of the electronic apparatus 1 to be able to collectively manage the operation of the electronic apparatus 1. The controller 100 is also considered as a control device or a control circuit. The controller 100 includes at least one processor for providing control and processing capability to execute various functions as described in detail below.

In accordance with various embodiments, the at least one processor may be implemented as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In the present example, the controller 100 comprises a central processing unit (CPU) 101, a digital signal processor (DSP) 102, and a storage 103. The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 103a to control the electronic apparatus 1. The CPU 101 and the DSP 102 execute the various control programs 103a in the storage 103 to achieve various functions of the controller 100.

The configuration of the controller 100 is not limited to the example described above. For example, the controller 100 may comprise a plurality of CPUs 101. It is also applicable that the controller 100 does not comprise the DSP 102 or comprises a plurality of DSPs 102. All or some of the functions of the controller 100 may be achieved by a hardware circuit that needs no software to achieve the functions above. The storage 103 may comprise a non-transitory computer readable recording medium other than the ROM and the RAM. The storage 103 may comprise, for example, a compact hard disk drive and a solid state drive (SSD).

The plurality of control programs 103a in the storage 103 include various applications (that is to say, application programs). The storage 103 stores, for example, a call application to perform a voice call and a video call, a browser to display a website, a map application for displaying a map, and a mail application to create, browse, send, and receive an e-mail. The storage 103 also stores a camera application to take a picture of an object using the first camera 180 and the second camera 190, a recorded image display application to display a still image and a video recorded in the storage 103, and a music reproduction control application to control a reproduction of music data stored in the storage 103. The storage 103 may store at least one application in the storage 103 in advance. The electronic apparatus 1 may download the at least one application in the storage 103 from the other device and store it in the storage 103.

The wireless communication unit 110 comprises an antenna 111. The wireless communication unit 110 can perform a wireless communication in several types of communication systems, for example, using the antenna 111. The controller 100 controls the wireless communication of the wireless communication unit 110.

The wireless communication unit 110 can perform a wireless communication with a base station of a mobile phone system. The wireless communication unit 110 can communicate with a mobile phone different from the electronic apparatus 1 or a web server via a network such as the base station or Internet. The electronic apparatus 1 can perform a data communication, a voice call, and a video call with the other mobile phone, for example.

The wireless communication unit 110 can perform a wireless communication using a wireless local area network (LAN) such as Wifi. The wireless communication unit 110 can perform a near field wireless communication. For example, the wireless communication unit 110 can perform the wireless communication in conformity to Bluetooth (registered trademark). The wireless communication unit 110 may perform the wireless communication in conformity to at least one of ZigBee (registered trademark) and near field communication (NFC).

The wireless communication unit 110 can perform various types of processing such as amplification processing on a signal received by the antenna 111 and then outputs a resultant signal to the controller 100. The controller 100 can perform the various types of processing on the received signal which has been input, to obtain information contained in the received signal. The controller 100 outputs a transmission signal containing the information to the wireless communication unit 110. The wireless communication unit 110 can perform the various types of processing such as amplification processing on the transmission signal being has been input, and then wirelessly transmits a resultant signal from the antenna 111.

The display 120 comprises the display surface 121 located in the front surface of the electronic apparatus 1 and a display panel 122. The display 120 can display various types of information in the display surface 121. The display panel 122 is a liquid crystal panel or an organic electroluminescence (EL) panel, for example. The display panel 122 can display various types of information such as characters, symbols, and graphics under control of the controller 100. The display panel 122 faces the display surface 121 in the apparatus case 11. The information displayed on the display panel 122 is displayed in the display surface 121.

The touch panel 130 can detect an operation performed on the display surface 121 with the operator such as the finger. The touch panel 130 is also considered as a detector detecting the operation being input to the display surface 121. The touch panel 130 is also considered as a touch sensor. The touch panel 130 is, for example, a projected capacitive touch panel. The touch panel 130 is located on a reverse side of the display surface 121, for example. When the user performs the operation on the display surface 121 with the operator such as his/her finger, the touch panel 130 can input, to the controller 100, an electrical signal in accordance with the operation. The controller 100 can specify contents of the operation performed on the display surface 121 based on the electrical signal (output signal) from the touch panel 130. The controller 100 can perform the processing corresponding to the specified operation contents. The controller 100 can thereby perform the processing corresponding to the operation detected in the touch panel 130. An in-cell display panel in which a touch panel is incorporated may be adopted instead of the display panel 122 and the touch panel 130. In this case, the display panel also functions as a sensor detecting the operation being input to the display surface 121.

When the user operates each operation button of the operation button group 140, the operation button can output to the controller 100 an operation signal indicating that the operation button has been operated. The controller 100 can accordingly determine whether or not each operation button has been operated for each operation button. The controller 100 to which the operation signal is input controls the other component, thereby causing the electronic apparatus 1 to execute the function allocated to the operated operation button.

The microphone 170 can convert a sound from the outside of the electronic apparatus 1 into an electrical sound signal and then output the electrical sound signal to the controller 100. The sound from the outside of the electronic apparatus 1 is taken inside the electronic apparatus 1 through the microphone hole, and input to the microphone 170.

The speaker 160 is, for example, a dynamic speaker. The speaker 160 can convert an electrical sound signal from the controller 100 into a sound and then output the sound. The sound being output from the speaker 160 is output outside through the speaker hole 13. The user can hear the sound being output from the speaker hole 13 in a place apart from the electronic apparatus 1.

The receiver 150 can output a received sound. The receiver 150 is, for example, a dynamic speaker. The receiver 150 can convert an electrical sound signal from the controller 100 into a sound and then output the sound. The sound being output from the receiver 150 is output outside through the receiver hole 12. A volume of the sound being output through the receiver hole 12 is set to be smaller than a volume of the sound being output through the speaker hole 13. The user brings the receiver hole 12 close to his/her ear, thereby being able to hear the sound being output through the receiver hole 12. The electronic apparatus 1 may comprise a vibration element such as a piezoelectric vibration element for causing a portion of the front surface of the apparatus case 11 to vibrate instead of the receiver 150. In this case, the sound is transmitted to the user in a form of the vibration of the portion of the front surface.

The first camera 180 comprises the lens 181, an image sensor, and so on. The second camera 190 comprises the lens 191, an image sensor, and so on. Each of the first camera 180 and the second camera 190 can take an image of an object under control of the controller 100, generate a still image or a video of the object, and then output the still image or the video to the controller 100.

The lens 181 of the first camera 180 can be visually recognized from the front surface 11a of the apparatus case 11. Accordingly, the first camera 180 can take an image of an object located on a front surface side (in other words, the display surface 121 side) of the electronic apparatus 1. The first camera 180 is referred to as an in-camera. In the meanwhile, the lens 191 of the second camera 190 can be visually recognized from the rear surface 11b of the apparatus case 11. Accordingly, the second camera 190 can take an image of an object located on a back surface side of the electronic apparatus 1. The second camera 190 is referred to as an out-camera.

The fingerprint sensor 200 can detect a fingerprint of the user's finger touching the detection object surface 201. Then, the fingerprint sensor 200 can output fingerprint information indicating the detected fingerprint to the controller 100.

Herein, the touch on the detection object surface 201 with the finger includes both a light contact of the finger with the detection object surface 201 and a press of the detection object surface 201 with the finger (in other words, a pressing the detection object surface 201 with the finger). Accordingly, the fingerprint sensor 200 can detect the fingerprint of the finger when the finger is in light contact with the detection object surface 201. The fingerprint sensor 200 can detect the fingerprint of the finger when the finger presses the detection object surface 201. The fingerprint sensor 200 can detect the fingerprint of the finger in any of the cases where the finger presses the detection object surface 201 weakly or hard. A fingerprint detection system in the fingerprint sensor 200 is, for example, a capacitance system. A system other than the capacitance system may also be adopted as the fingerprint detection system in the fingerprint sensor 200. For example, an optical system may be adopted as the fingerprint detection system in the fingerprint sensor 200. The controller 100 can perform the processing based on a fingerprint detection result in the fingerprint sensor 200 as described below. The fingerprint detected by the fingerprint sensor 200 is referred to as "the detected fingerprint" in some cases hereinafter. The fingerprint information being output from the fingerprint sensor 200 is referred to as "the detected fingerprint information" in some cases. The simple term of "the fingerprint detection result" means the fingerprint detection result in the fingerprint sensor 200.

The accelerometer 210 can detect an acceleration of the electronic apparatus 1. The accelerometer 210 is a three-axis accelerometer, for example. The accelerometer 210 can detect an acceleration of the electronic apparatus 1 in an x axis direction, a y axis direction and a z axis direction. The x axis direction, the y axis direction, and the z axis direction are set to a longitudinal direction, a short-side direction, and a thickness direction of the electronic apparatus 1, respectively, for example.

The proximity sensor 220 is an infrared system proximity sensor, for example. The proximity sensor 220 outputs a detection signal when an object gets within a predetermined distance from the proximity sensor 220. A detection signal is input to the controller 100. The proximity sensor 220 can detect the object getting close to the front surface 11a of the apparatus case 11, in other words, the front surface of the electronic apparatus 1.

The battery 250 can output a power source for the electronic apparatus 1. The battery 250 is, for example, a rechargeable battery. The battery 250 can supply the power source to various components such as the controller 100 and the wireless communication unit 110 included in the electronic apparatus 1.

The electronic apparatus 1 may comprise a sensor other than the touch sensor 130, the fingerprint sensor 200, the accelerometer 210, and the proximity sensor 220. For example, the electronic apparatus 1 may comprise at least one of an atmospheric pressure sensor, a geomagnetic sensor, a temperature sensor, an illuminance sensor, a gyro sensor, and a position detection sensor.

<One Example of Operation Mode of Electronic Apparatus>

The electronic apparatus 1 has a large number of operation modes. The operation modes of the electronic apparatus 1 include, for example, a normal mode, a sleep mode, and a shutdown mode. In the shutdown mode, the electronic apparatus 1 is shut down, and most functions of the electronic apparatus 1 are suspended. In the sleep mode, some functions of the electronic apparatus 1, including a display function, are suspended. Operating in the normal mode means that the electronic apparatus 1 operates in a mode other than the sleep mode and the shutdown mode. The controller 100 sets the operation mode of the electronic apparatus 1 by controlling predetermined components of the electronic apparatus 1 in accordance with the operation mode to be set.

In the sleep mode, for example, some configurations of the electronic apparatus 1, including the display panel 122, the touch panel 130, the first camera 180, and the second camera 190, do not operate. In the shutdown mode, most configurations of the electronic apparatus 1, including the display panel 122, the touch panel 130, the first camera 180, and the second camera 190, for example, do not operate. In the sleep mode, the electronic apparatus 1 consumes less power than in the normal mode. In the shutdown mode, the electronic apparatus 1 consumes less power than in the sleep mode. In the sleep mode and in the shutdown mode, the display surface 121 is in a non-display state.

In the present example, if the power source button 144 is pressed for a long time in the normal mode, the display surface 121 displays a confirmation screen to confirm with the user about whether or not to make the operation mode transition from the normal mode to the shutdown mode. If the user performs a predetermined operation on the display surface 121 in a state where the display surface 121 displays the confirmation screen, the operation mode transitions from the normal mode to the shutdown mode.

If no operation is performed on the electronic apparatus 1 for a given period of time or more in the normal mode, the operation mode transitions from the normal mode to the sleep mode. The operation mode transitions from the normal mode to the sleep mode when the power source button 144 is pressed for a short time in the normal mode.

In the meanwhile, the operation mode transitions from the sleep mode to the normal mode when the power source button 144 is pressed for a short time in the sleep mode. That is to say, when the power source button 144 is pressed for a short time in the sleep mode, the functions suspended at transition to the sleep mode are restored in the electronic apparatus 1. The normal mode in the present example includes a lock mode which will be described hereinafter. The operation mode transitions from the sleep mode to the lock mode when the power source button 141 is pressed for a short time in the sleep mode. As described hereinafter, when a user authentication is succeeded in the sleep mode, the operation mode transitions from the sleep mode to the normal mode.

The normal mode includes the operation mode of the electronic apparatus 1 described below other than the shutdown mode and the sleep mode without a particular description. The operation mode simply means the operation mode of the electronic apparatus 1.

<One Example of Screen Displayed on Display Surface>

Figure 7:
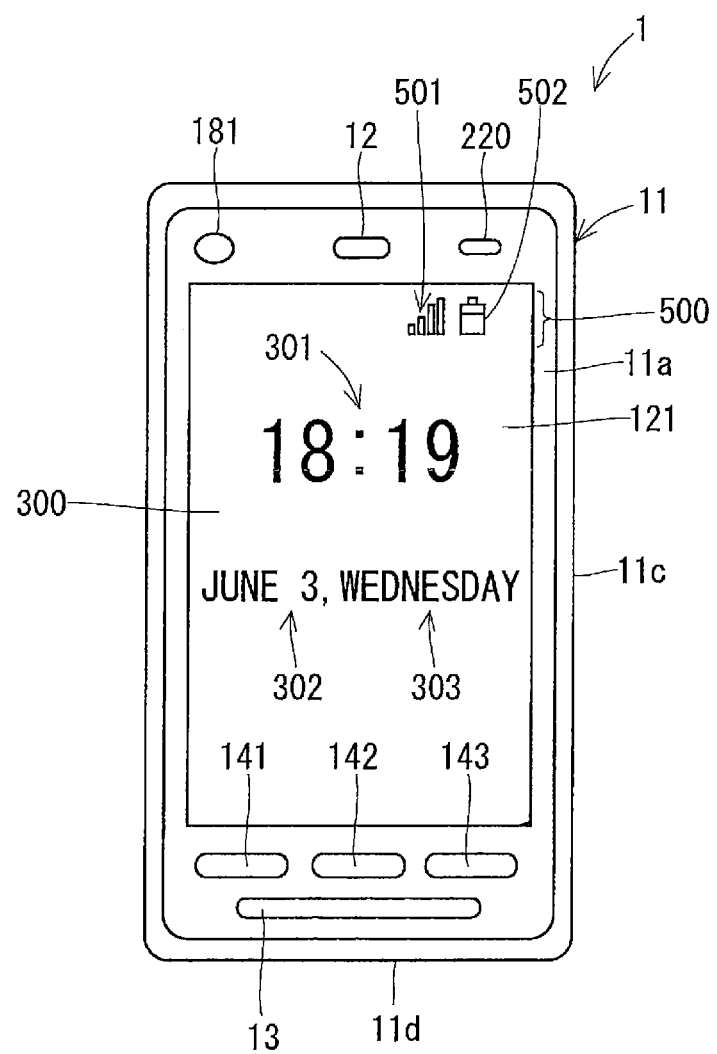
FIG. 7 illustrates a drawing showing one example of a display of the electronic apparatus.

The display surface 121 displays various screens in the normal mode. The screen displayed on the display surface 121 is also considered as an image displayed in the display surface 121. The display surface 121 displays a home screen and a lock screen, for example. FIG. 7 illustrates a drawing showing one example of the lock screen 300. FIG. 8 illustrates a drawing showing one example of the home screen 400.

As illustrated in FIG. 7, the lock screen 300 indicates a current time 301, a current date 302, and a current day 303, for example.

The normal mode herein includes a lock mode in which the user cannot make the electronic apparatus 1 execute any applications other than specific applications (e.g., the call application and the camera application) of a plurality of applications stored in the storage 103. The lock mode is also referred to as the screen lock mode. In the lock mode, the user cannot instruct the electronic apparatus 1 to execute each of the applications other than the specific applications of the plurality of applications stored in the storage 103. The lock screen 300 is a screen indicating that the electronic apparatus 1 is in the lock mode, and is displayed in the display surface 121 when the operation mode is the lock mode. In the lock mode, it is not necessary for the user to be able to make the electronic apparatus 1 execute all the applications stored in the storage 103.

When the power source button 144 is pressed for a short time in the sleep mode, the sleep mode is canceled, and the operation mode transitions to the lock mode. The lock screen 300 is thus displayed in the display surface 121. When the user performs a predetermined operation on the electronic apparatus 1 during display of the lock screen 300 in the display surface 121, the lock mode of the electronic apparatus 1 is canceled, and the display in the display surface 121 transitions from the lock screen 300 to another screen, such as the home screen 400 (refer to FIG. 8), for example. A state where the lock mode has been canceled in the normal mode is also referred to as an "unlock mode" in some cases hereinafter.

Not only the lock screen 300 but also each screen displayed in the display surface 121 includes a notification region 500 for transmitting a notification of a state of the electronic apparatus 1. The notification region 500 is also referred to as a status bar. As illustrated in FIG. 7, the notification region 500 included in the lock screen 300 comprises an icon (in other words, a graphic) 501 indicating a communication state and an icon 502 indicating a remaining battery level, for example. In the meanwhile, the notification region 500 included in the home screen 400 comprises the icons 501 and 502 and an icon 503 indicating a current time as illustrated in FIG. 8, for example.

When a specific event occurs in the electronic apparatus 1, information regarding the event which has occurred is indicated in the notification region 500. The information includes, for example, an icon for transmitting a notification of a receipt of a new e-mail and an icon for transmitting a notification of an absence incoming call.

As illustrated in FIG. 8, the home screen 400 shows icons 405, corresponding to the applications in the storage 103, for instructing the electronic apparatus 1 to execute the corresponding applications. In the example in FIG. 8, the home screen 400 shows ten icons 405. The user can select any of the icons 405 by performing a predetermined operation (e.g., a tap operation) on the icon 405. The controller 100 reads, from the storage 103, an application corresponding to the selected icon 405 and executes the application. That is to say, when the touch panel 130 detects the predetermined operation performed on the icon 405, the controller 100 reads, from the storage 103, the application corresponding to the icon 405 and executes the application. The user can thus select the icon 405 by operating the icon 405 and make the electronic apparatus 1 execute the application corresponding to the selected icon 405. For example, when the user performs the tap operation on the icon 405 corresponding to a browser, the electronic apparatus 1 executes the browser. When the user performs the tap operation on the icon 405 corresponding to the camera application, the electronic apparatus 1 executes the camera application.

A plurality of pages constitute the home screen 400, for example. FIG. 8 illustrates a page of the home screen 400. Each page shows the icons 405. The plurality of pages constituting the home screen 400 are virtually arranged in the right and left direction. When the user performs the flick operation or the slide operation in the right and left direction on the display surface 121, the display surface 121 displays the adjacent page. The flick operation indicates an operation of flicking the operation object surface with the operator such as the finger. The slide operation indicates an operation performed by an operator such as the finger moving and stopping while touching the operation object surface. The slide operation is also referred to as a swipe operation. Each page in the home screen 400 is also considered as a type of screen displayed in the display surface 121.

<One Example of Fingerprint Authentication>

When the operation mode is the normal mode, the controller 100 can perform a fingerprint authentication based on the detected fingerprint information. The fingerprint authentication is considered as a user authentication based on the fingerprint detection result. In performing the fingerprint authentication, the controller 100 compares the detected fingerprint information, that is to say, the fingerprint information indicating the fingerprint detected in the fingerprint sensor 200 and reference fingerprint information stored in the storage 103. The reference fingerprint information is fingerprint information indicating a fingerprint of an authorized user (an owner of the electronic apparatus 1, for example). The controller 100 determines that the fingerprint authentication is succeeded if the detected fingerprint information and the reference fingerprint information are similar to each other as a result of comparison. That is to say, the controller 100 determines that the user having the fingerprint detected by the fingerprint sensor 200 is the authorized user if the detected fingerprint information and the reference fingerprint information are similar to each other. On the other hand, the controller 100 determines that the fingerprint authentication is failed if the detected fingerprint information and the reference fingerprint information are not similar to each other. That is to say, the controller 100 determines that the user having the fingerprint detected by the fingerprint sensor 200 is an unauthorized user.

The normal mode includes a fingerprint registration mode for registering the fingerprint information indicating the fingerprint detected by the fingerprint sensor 200 as the reference fingerprint information in the electronic apparatus 1. The electronic apparatus 1 operates in the fingerprint registration mode when a predetermined operation is performed on the display surface 121 in the unlock mode. In the fingerprint registration mode, when the authorized user touches the detection object surface 201 with his/her finger (a ball of the finger in detail) of the hand, the fingerprint sensor 200 detects the fingerprint of the finger, and outputs the fingerprint information indicating the detected fingerprint. When the electronic apparatus 1 operates in the fingerprint registration mode, the authorized user touches the detection object surface 201 several times with the ball of the finger while changing a portion of the ball of his/her finger being in contact with the detection object surface 201, for example. Thus, the fingerprint sensor 200 detects the fingerprint of the finger of the authorized user several times. That is to say, the fingerprint sensor 200 outputs the detected fingerprint information indicating the fingerprint of the authorized user several times. The controller 100 collectively stores the detected fingerprint information being output from the fingerprint sensor 200 several times as the reference fingerprint information in the storage 103. Accordingly, the reference fingerprint information indicating the fingerprint of the authorized user is registered in the electronic apparatus 1.

In some cases, plural pieces of reference fingerprint information are stored in the storage 103. The plural pieces of reference fingerprint information in the storage 103 include plural pieces of reference fingerprint information indicating fingerprints of a plurality of fingers of the same authorized user, respectively, for example, in some cases. The plural pieces of reference fingerprint information in the storage 103 include plural pieces of reference fingerprint information indicating fingerprints of fingers of a plurality of authorized users different from each other (for example, a plurality of users constituting a family), respectively, for example, in some cases. If the storage 103 stores the plural pieces of reference fingerprint information, the controller 100 compares the detected fingerprint information and each of the plural pieces of reference fingerprint information in the storage 103. As a result, the controller 100 determines that the fingerprint authentication is succeeded if the detected fingerprint information is similar to any of the plural pieces of reference fingerprint information. In the meanwhile, the controller 100 determines that the fingerprint authentication is failed if the detected fingerprint information is not similar to any of the plural pieces of reference fingerprint information.

<One Example of Method of Using Fingerprint Authentication>

The user can use the fingerprint authentication performed by the controller 100 in various situations. For example, the user can use the fingerprint authentication when user intends to download an application from a server device providing the application in the electronic apparatus 1. For example, when the fingerprint authentication is succeeded in the controller 100, the electronic apparatus 1 communicating with the server device providing the application downloads the application from the server device. In the meanwhile, when the fingerprint authentication is failed in the controller 100, the electronic apparatus 1 cannot download the application from the server device.

The user can use the fingerprint authentication to perform a credit-card payment using the electronic apparatus 1. For example, when the fingerprint authentication is succeeded in the controller 100, the electronic apparatus 1 accessing a website, which is managed by a company providing goods, notifies the server device managed by the company that the user intends to perform the credit-card payment. In the meanwhile, when the fingerprint authentication is failed in the controller 100, the electronic apparatus 1 does not notify the server device of the company that the user intends to perform the credit-card payment.

The user can use the fingerprint authentication to make the electronic apparatus 1 change the operation mode thereof from the sleep mode to the unlock mode. One example of the operation of the electronic apparatus 1 in this case is described hereinafter.

In the case where the operation mode is set to the sleep mode, when the fingerprint sensor 200 detects the fingerprint, the controller 100 cancels the sleep mode, and sets the operation mode to the lock mode. The lock screen 300 is thus displayed in the display surface 121 (refer to FIG. 7).

Next, the controller 100 performs the fingerprint authentication based on the fingerprint detection result in the fingerprint sensor 200 as described above. When the fingerprint authentication is succeeded, the controller 100 cancels the lock mode, and sets the operation mode to the unlock mode. Then, the controller 100 makes the display 120 display the home screen 400 (refer to FIG. 8), for example. In the meanwhile, when the fingerprint authentication is failed, the controller 100 makes the display 120 display the notification information notifying that the user authentication has been failed. This notification information is shown on the lock screen 300, for example.

When the operation mode is the lock mode, the user touches the detection object surface 201 with his/her finger, thereby being able to make the electronic apparatus 1 change the operation mode thereof from the lock mode to the unlock mode. In this case, when the fingerprint sensor 200 detects the fingerprint in the state where the operation mode is the lock mode, the controller 100 performs the fingerprint authentication based on the fingerprint detection result in the fingerprint sensor 200. When the fingerprint authentication is succeeded, the controller 100 cancels the lock mode, and sets the operation mode to the unlock mode. Then, the controller 100 makes the display 120 display the home screen 400, for example. In the meanwhile, when the fingerprint authentication is failed, the controller 100 makes the display 120 display the notification information notifying that the user authentication has been failed.

<Enlargement and Reduction of Display of Screen>

In the present example, the user operates the detection object surface 201 with his/her finger, thereby being able to make the electronic apparatus 1 enlarge and reduce the display of the screen displayed in the display surface 121. For example, when a map is displayed in the display surface 121, the user operates the detection object surface 201 with his/her finger, thereby being able to make the electronic apparatus 1 enlarge and reduce the display of the map. When a webpage is displayed in the display surface 121, the user operates the detection object surface 201 with his/her finger, thereby being able to make the electronic apparatus 1 enlarge and reduce the display of the webpage. Described below is one example of the operation of the electronic apparatus 1 in the case where the display of the screen displayed in the display surface 121 is enlarged and reduced. The screen means the screen displayed in the display surface 121 hereinafter. The screen on which display processing is to be performed is referred to an object screen in some cases. The operation performed on the detection object surface 201 means the operation performed by the finger on the detection object surface 201.

In the present example, the controller 100 can specify the operation performed on the detection object surface 201 based on the fingerprint detection result of the fingerprint sensor 200. For example, the controller 100 can specify the slide operation, the flick operation, and a tap operation performed on the detection object surface 201 based on the fingerprint detection result. In the case where the operation mode is the normal mode, when the controller 100 specifies a predetermined operation performed on the detection object surface 201 based on the fingerprint detection result, the controller 100 sets the operation mode to an enlargement-reduction mode for enlarging or reducing the display of the screen in accordance with the operation performed on the detection object surface 201. This predetermined operation is referred to as an enlargement-reduction mode setting operation in some cases. Adopted as the enlargement-reduction mode setting operation is, for example, the tap operation, a double tap operation, or a long tap operation (in other words, a long press operation).

In the case where the operation mode is the enlargement-reduction mode, when the controller 100 specifies an enlargement operation for instructing to enlarge the display of the screen performed on the detection object surface 201 based on the fingerprint detection result, the controller 100 controls the display 120 to enlarge the display of the screen. In the case where the operation mode is the enlargement-reduction mode, when the controller 100 specifies a reduction operation for instructing to reduce the display of the screen performed on the detection object surface 201 based on the fingerprint detection result, the controller 100 controls the display 120 to reduce the display of the screen. A slide operation in an upper direction is adopted as the enlargement operation, for example. A slide operation in a lower direction is adopted as the reduction operation, for example. The enlargement operation and the reduction operation are not limited thereto.

Figure 9:
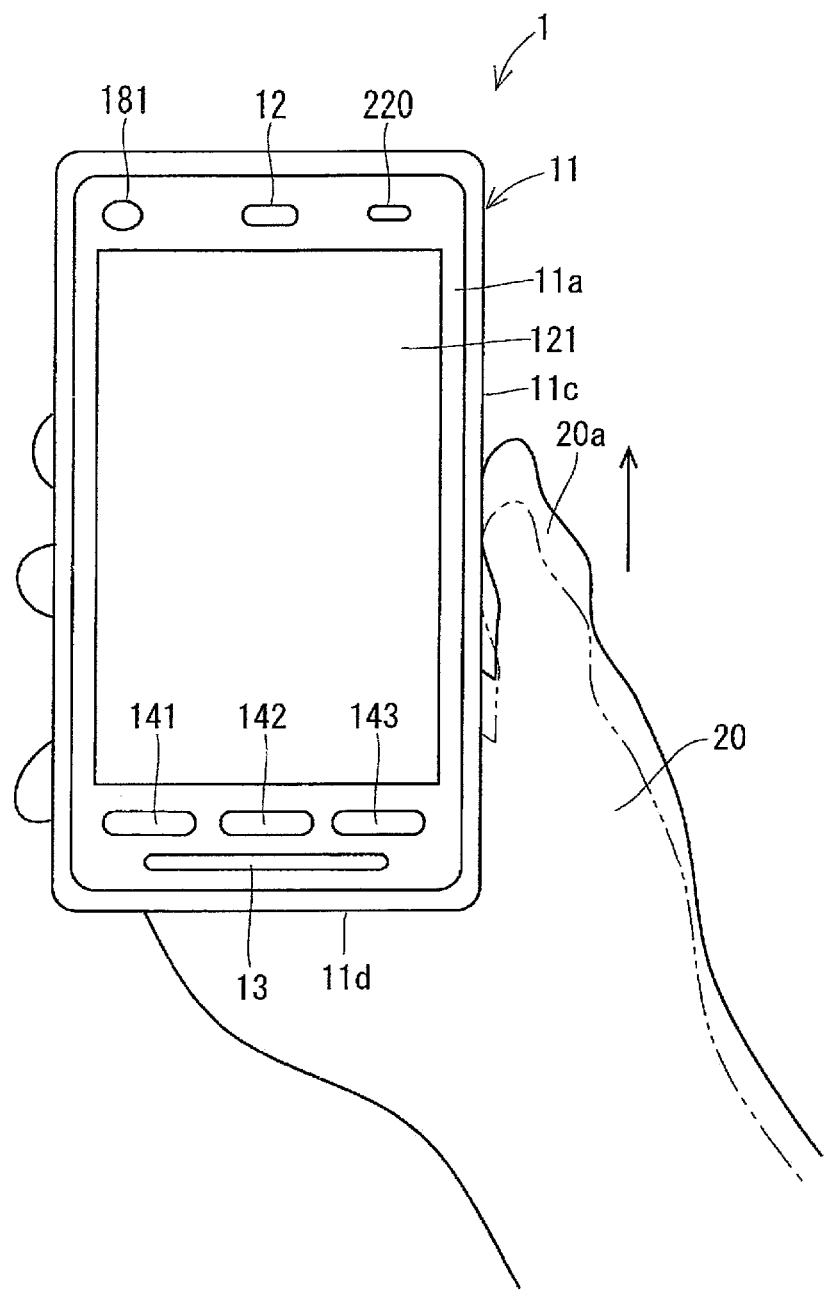
FIG. 9 illustrates a drawing showing one example of a user operating the electronic apparatus.
Figure 10:
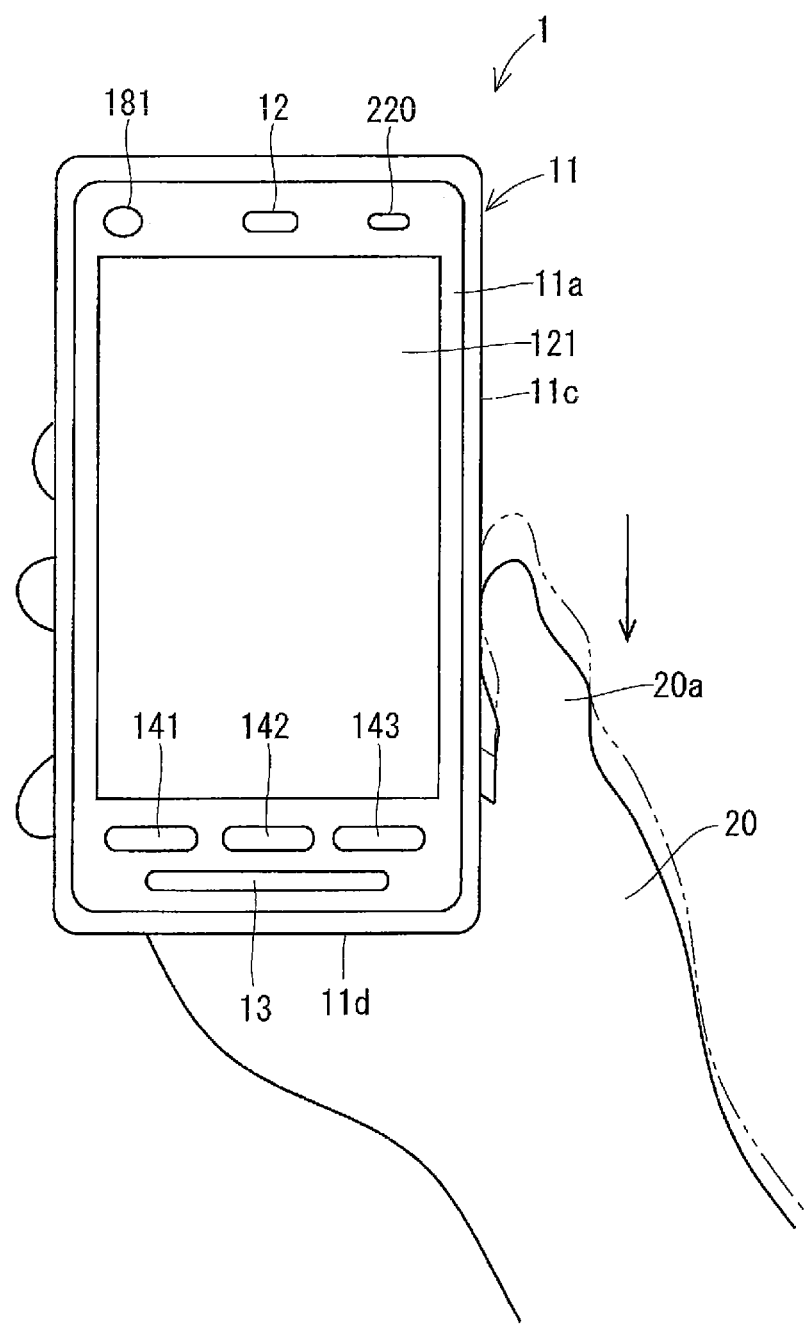
FIG. 10 illustrates a drawing showing one example of a user operating the electronic apparatus.

FIG. 9 is a drawing showing one example of the slide operation performed in the upper direction on the detection object surface 201. FIG. 10 is a drawing showing one example of the slide operation performed in the lower direction on the detection object surface 201. FIG. 9 and FIG. 10 illustrate the slide operation performed by the user, who holds the electronic apparatus 1 in the right hand 20, on the detection object surface 201 with the thumb 20a of the right hand 20.

In the present example, the controller 100 changes an enlargement ratio of the display of the screen in accordance with an amount of sliding in the slide operation in the upper direction as the enlargement operation. In other words, the controller 100 changes the enlargement ratio of the display of the screen in accordance with an amount of movement of the finger in the upper direction on the detection object surface 201. The controller 100 increases the enlargement ratio of the display of the screen with the increase in the amount of sliding in the upper direction. The controller 100 gradually enlarges the display of the screen in accordance with the movement of the finger in the upper direction on the detection object surface 201. If the user moves the finger fast in the upper direction on the detection object surface 201, the display of the screen is enlarged fast. In the meanwhile, if the user moves the finger slowly in the upper direction on the detection object surface 201, the display of the screen is enlarged slowly. The user performs the enlargement operation repeatedly on the detection object surface 201, thereby being able to make the electronic apparatus 1 enlarge the display of the screen repeatedly.

The controller 100 changes a reduction ratio of the display of the screen in accordance with the amount of sliding in the slide operation in the lower direction as the reduction operation. In other words, the controller 100 changes the reduction ratio of the display of the screen in accordance with an amount of movement of the finger in the lower direction on the detection object surface 201. The controller 100 increases the reduction ratio of the display of the screen with the increase in the amount of sliding in the lower direction. The controller 100 gradually reduces the display of the screen in accordance with the movement of the finger in the lower direction on the detection object surface 201. If the user moves the finger fast in the lower direction on the detection object surface 201, the display of the screen is reduced fast accordingly. In the meanwhile, if the user moves the finger slowly in the lower direction on the detection object surface 201, the display of the screen is reduced slowly accordingly. The user performs the reduction operation repeatedly on the detection object surface 201, thereby being able to make the electronic apparatus 1 reduce the display of the screen repeatedly.

Upon specifying the enlargement operation performed on the detection object surface 201, the controller 100 enlarges the display of the object screen, centering on a reference point in the object screen. Upon specifying the reduction operation performed on the detection object surface 201, the controller 100 reduces the display of the object screen, centering on the reference point in the object screen. In the present example, the user operates the display surface 121, thereby being able to designate the reference point on the object screen. In the case where the operation mode is the enlargement-reduction mode, when the controller 100 specifies a designation operation for designating the reference point performed on the object screen displayed in the display surface 121 based on the detection result in the touch panel 130, the controller 100 enlarges or reduces the display of the object screen, centering on the designated reference point. This designation operation is referred to as the reference point designation operation in some cases hereinafter.

Figure 11:
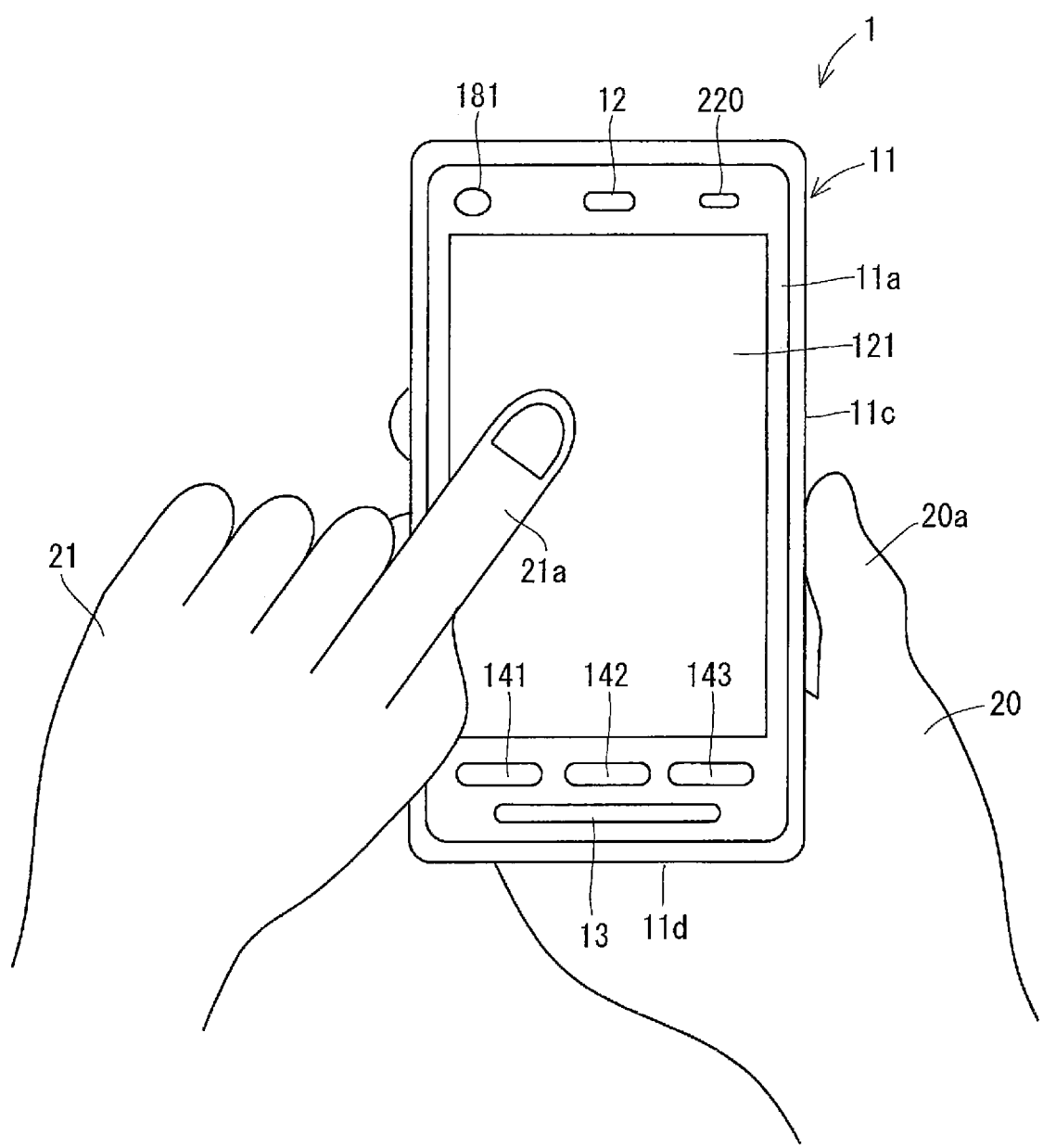
FIG. 11 illustrates a drawing showing one example of a user operating the electronic apparatus.

The tap operation performed on the object screen, for example, is adopted as the reference point designation operation. The controller 100 sets the position where the tap operation as the reference point designation operation is performed in the object screen to the reference point. FIG. 11 is a drawing showing one example of the tap operation performed on the object screen as the reference point designation operation. The example in FIG. 11 shows that the user holding the electronic apparatus 1 with the right hand 20 performs the tap operation as the reference point designation operation with the second finger 21a of a left hand 21.

When the controller 100 specifies the enlargement operation performed on the detection object surface 201 after specifying the reference point designation operation performed on the object screen, the controller 100 enlarges the display of the object screen, centering on the reference point designated in the reference point designation operation. At this time, the controller 100 enlarges the object screen, centering on the reference point, so that the reference point designated in the object screen is located in the center of the display region of the object screen (referred to as the object screen display region in some cases hereinafter) in the display surface 121. When the reduction operation is performed on the detection object surface 201 after the reference point designation operation is performed on the object screen, the controller 100 reduces the display of the object screen, centering on the reference point designated in the reference point designation operation. At this time, the controller 100 reduces the display of the object screen, centering on the reference point, so that the reference point designated in the object screen is located in the center of the object screen display region.

Figure 12:
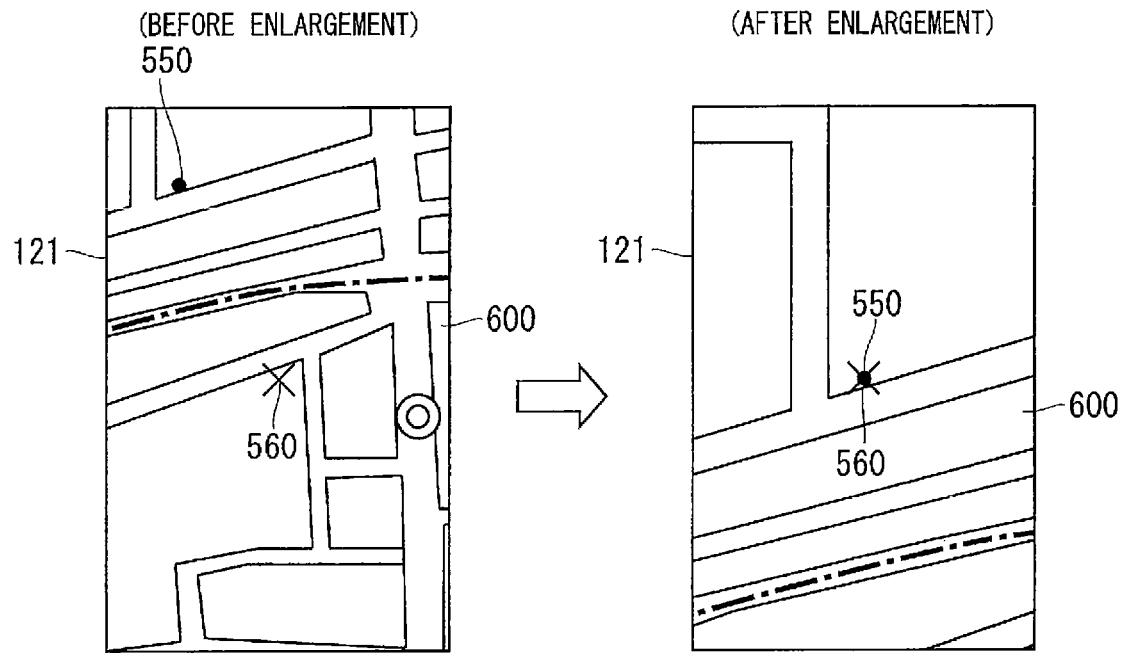
FIG. 12 illustrates a drawing showing one example of a display of the electronic apparatus.

FIG. 12 is a drawing showing one example of the display of the object screen which is enlarged. FIG. 12 illustrates that a display of a map 600 as the object screen is enlarged. The map 600 whose display has not been enlarged yet is shown on a left side in FIG. 12. The map 600 whose display has been enlarged is shown on a right side in FIG. 12. In FIG. 12, a reference point 550 designated by the user is indicated by a black circle. This circle may be or may not be displayed in the display surface 121. A center 560 of the object screen display region is indicated by a cross mark in FIG. 12. This cross mark may be or may not be displayed in the display surface 121. In the present example, the whole region of the display surface 121 is the object screen display region, thus the center 560 of the object screen display region coincides with the center of the display surface 121. Only part of the display surface 121 may be the object screen display region.

When the enlargement operation is performed on the detection object surface 201 in the state where the display of the display surface 121 is indicated on the left side in FIG. 12 (refer to FIG. 9), as illustrated on the right side in FIG. 12, the display of the map 600 is enlarged, centering on the reference point 550, so that the reference point 550 designated to the map 600 is located in the center 560 of the object screen display region (that is to say, the display region of the map 600 in the display surface 121).

Figure 13:
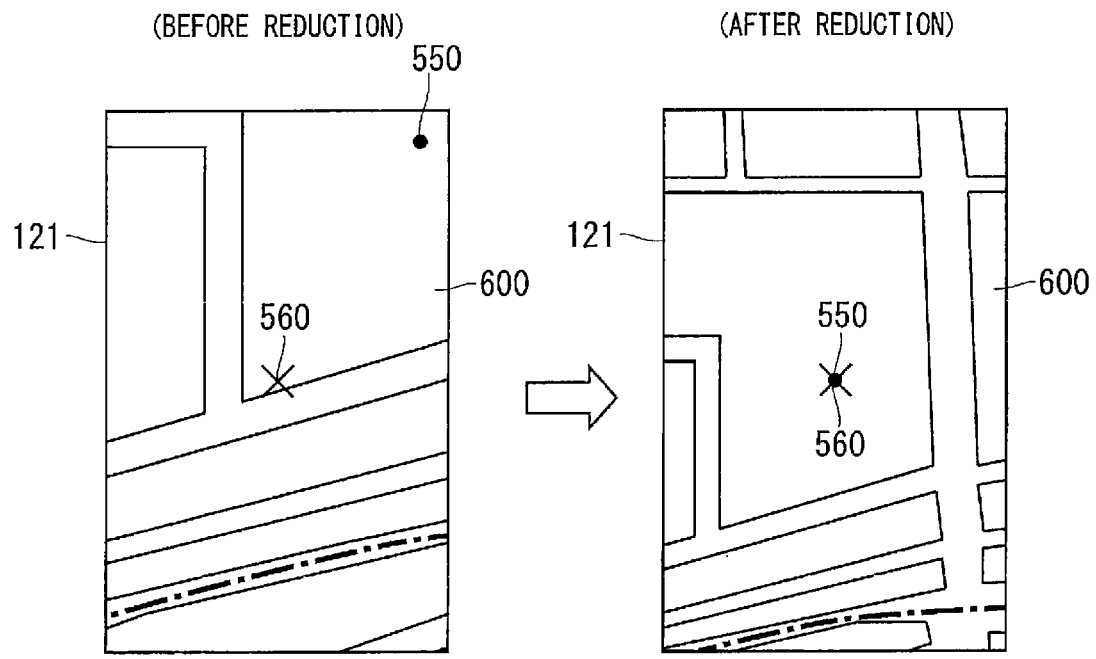
FIG. 13 illustrates a drawing showing one example of a display of the electronic apparatus.

FIG. 13 is a drawing showing one example of the display of the object screen which is reduced. The map 600 whose display has not been reduced yet is shown on a left side in FIG. 13. The map 600 whose display has been reduced is shown on a right side in FIG. 13. When the reduction operation is performed on the detection object surface 201 in the state where the display of the display surface 121 is indicated on the left side in FIG. 13 (refer to FIG. 10), as illustrated on the right side in FIG. 13, the display of the map 600 is reduced, centering on the reference point 550, so that the reference point 550 designated to the map 600 is located in the center 560 of the display region of the map 600 in the display surface 121.

When the controller 100 enlarges or reduces the display of the object screen again after enlarging or reducing the object screen, the controller 100 enlarges or reduces the display of the object screen so that the reference point is located in the center of the object screen display region in the similar manner. At this time, when the reference point is located in the center of the object screen display region, the display of the object screen is enlarged or reduced, centering on the center of the object screen display region. Upon specifying the reference point designation operation again, the controller 100 enlarges or reduces the display of the object screen so that the reference point newly designated in the reference point designation operation is located in the center of the object screen display region.

Figure 14:
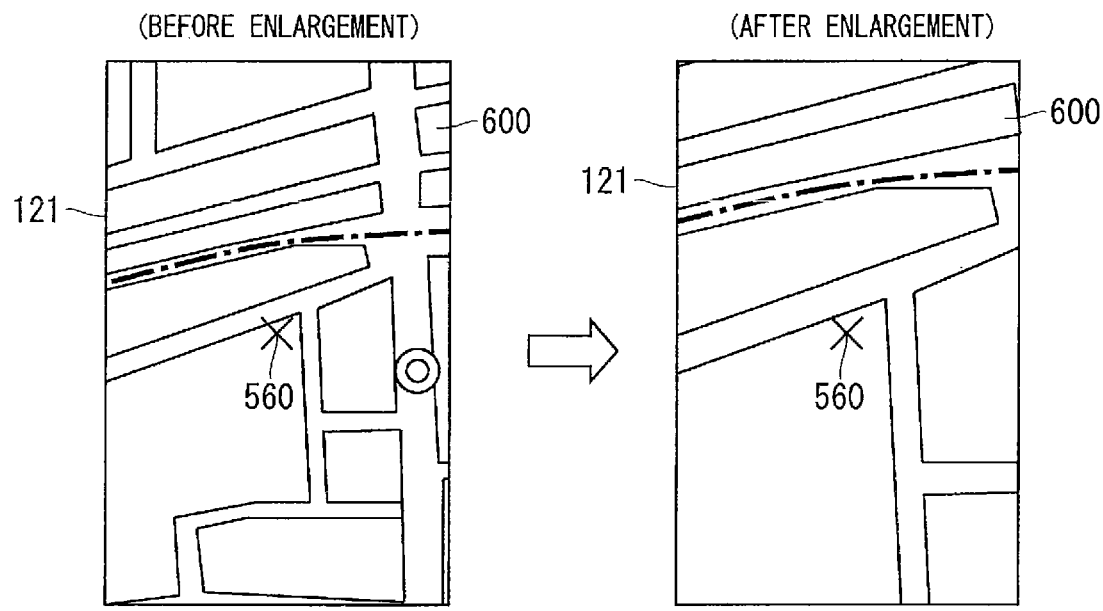
FIG. 14 illustrates a drawing showing one example of a display of the electronic apparatus.

When the controller 100 specifies the enlargement operation or the reduction operation in the state where the user does not designate the reference point to the object screen, the controller 100 enlarges or reduces the display of the object screen, centering on an initial position of the reference point. A position coinciding with the center of the object screen display region, for example, is adopted as the initial position of the reference point of the object screen. FIG. 14 is a drawing showing one example that the display of the map 600 which is the object screen is enlarged, centering on the position coinciding with the center 560 of the object screen display region. FIG. 14 illustrates the map 600 which has not been enlarged yet on a left side, and illustrates the map 600 which has been enlarged on a right side.

The controller 100 may enlarge the display of the object screen upon specifying a pinch-out operation performed on the object screen regardless of whether or not the operation mode is set to the enlargement-reduction mode. The controller 100 may reduce the display of the object screen upon specifying a pinch-in operation performed on the object screen regardless of whether or not the operation mode is set to the enlargement-reduction mode.

When the controller 100 sets the operation mode to the enlargement-reduction mode and subsequently determines that the finger gets away from the detection object surface 201 based on the fingerprint detection result, the controller 100 may cancel the enlargement-reduction mode. In the case where the operation mode is the enlargement-reduction mode, when the controller 100 specifies the same operation as the enlargement-reduction mode setting operation performed on the detection object surface 201, the controller 100 may cancel the enlargement-reduction mode.

As described above, in the present example, when the controller 100 specifies a predetermined operation performed on the detection object surface 201 of the fingerprint sensor 200, the controller 100 enlarges or reduces the display of the screen. Accordingly, the user can make the electronic apparatus 1 enlarge or reduce the display of the screen by operating the detection object surface 201. Thus, the convenience of the electronic apparatus 1 is improved.

In the present example, when the controller 100 specifies the reference point designation operation performed on the object screen, the controller 100 enlarges or reduces the display of the object screen, centering on the reference point designated in the reference point designation operation. Accordingly, the user operates the display surface 121, thereby being able to designate, to the electronic apparatus 1, the position in the screen as the center in enlarging or reducing the display of the screen. Thus, the convenience of the electronic apparatus 1 is improved.

In the present example, the controller 100 enlarges or reduces the display of the object screen so that the designated reference point is located in the center of the object screen display region. Accordingly, the user can easily confirm an area near the reference point designated in the object screen. Thus, the convenience of the electronic apparatus 1 is improved.

Figure 15:
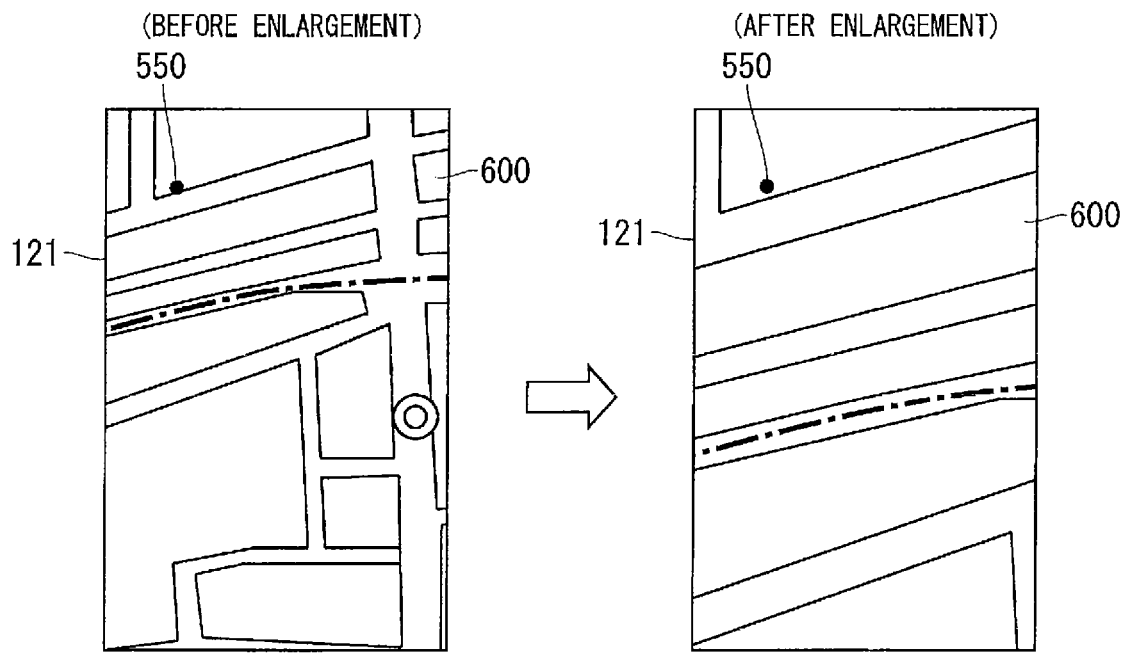
FIG. 15 illustrates a drawing showing one example of a display of the electronic apparatus.

Differing from the example described above, the display of the object screen may be enlarged or reduced, centering on the reference point, without the movement of the reference point designated to the object screen. FIG. 15 is a drawing showing one example that the display of the map 600 which is the object screen is enlarged, centering on the reference point 560, without the movement of the reference point 550 designated to the map 600. FIG. 15 illustrates the map 600 which has not been enlarged yet on a left side, and illustrates the map 600 which has been enlarged on a right side.

In the case where the operation mode is not set to the enlargement-reduction mode, when the controller 100 specifies the reference point designation operation performed on the object screen, the controller 100 may set the operation mode to the enlargement-reduction mode. In this case, the user performs the reference point designation operation on the electronic apparatus 1, thereby being able to designate the reference point to the electronic apparatus 1 and make the electronic apparatus 1 set the operation mode to the enlargement-reduction mode. Thus, the convenience of the electronic apparatus 1 is improved.

When the controller 100 sets the operation mode to the enlargement-reduction mode in specifying the reference point designation operation performed on the object screen, the controller 100 may not accept the enlargement-reduction mode setting operation performed on the detection object surface 201.

Upon specifying the reference point designation operation when the controller 100 sets the operation mode to the enlargement-reduction mode in the case where the reference point designation operation performed on the object screen is specified, the controller 100 may show, in the object screen, first notification information indicating that the enlargement operation and the reduction operation performed on the detection object surface 201 are accepted. The first notification information is also considered as information indicating that the operation mode is the enlargement-reduction mode. The first notification information is shown in the object screen while the operation mode is the enlargement-reduction mode.

Figure 16:
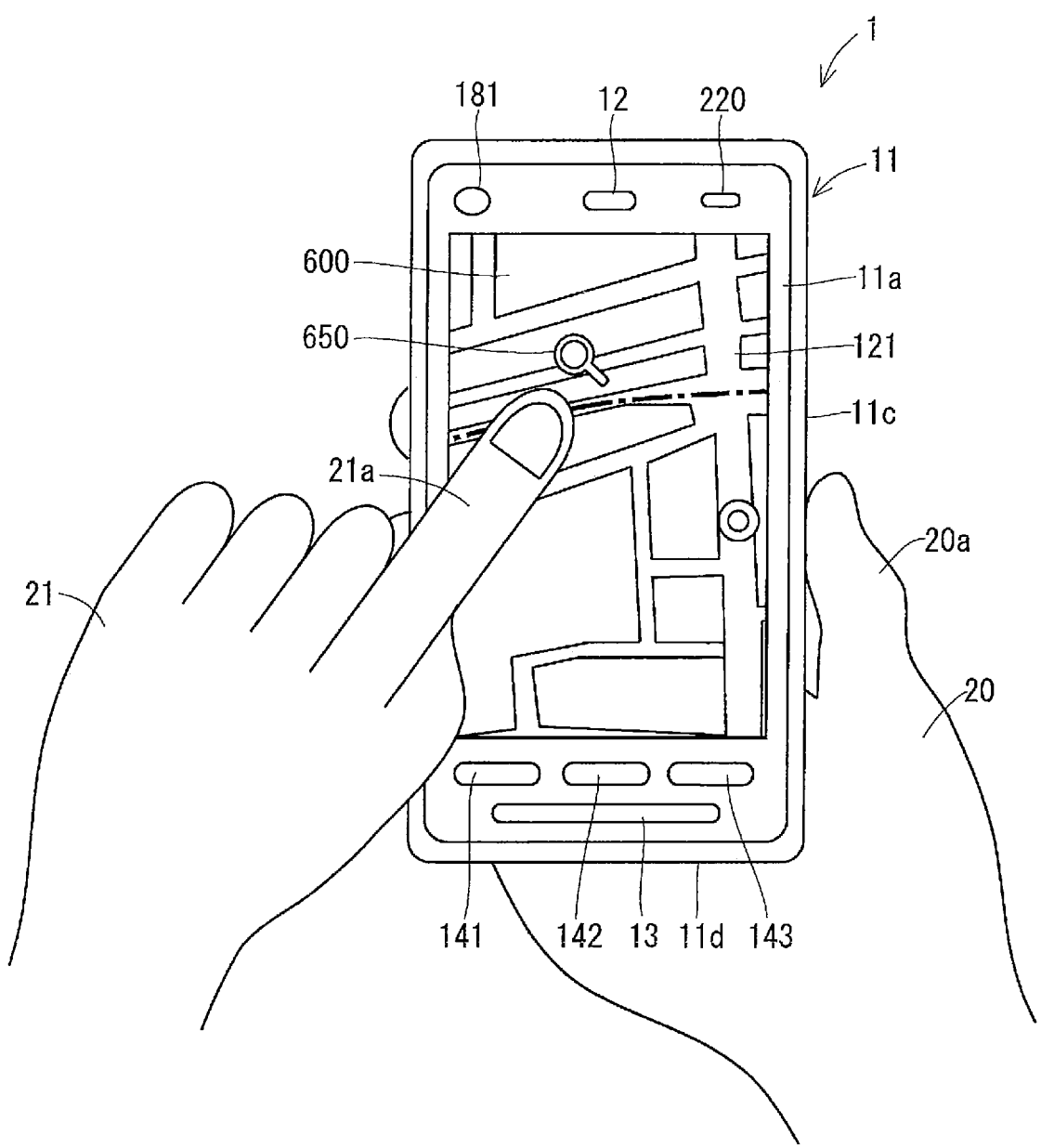
FIG. 16 illustrates a drawing showing one example of a display of the electronic apparatus.

FIG. 16 is a drawing showing a display example of first notification information 650. FIG. 16 illustrates the user performing the reference point designation operation with the second finger 21a of the left hand 21. FIG. 16 illustrates the first notification information 650 in the map 600 which is the object screen. In the example in FIG. 16, the first notification information 650 is a graphic indicating a magnifying glass, but is not limited thereto.

As described above, the object screen shows the first notification information 650, thus the user can easily recognize that the electronic apparatus 1 can accept the enlargement operation and the reduction operation. In other words, the user can easily recognize that the operation mode of the electronic apparatus 1 is the enlargement-reduction mode. Thus, the convenience of the electronic apparatus 1 is improved. The controller 100 may show the first notification information 650 in the object screen when the controller 100 accept the enlargement-reduction mode setting operation performed on the detection object surface 201.

The controller 100 may show the first notification information 650 in the object screen for a predetermined period of time (for example, several seconds to ten seconds) upon specifying the reference point designation operation. In this case, the controller 100 may set the operation mode to the enlargement-reduction mode only when the controller 100 shows the first notification information 650 in the object screen. Accordingly, the controller 100 accepts the enlargement operation and the reduction operation when the controller 100 shows the first notification information 650 in the object screen, and does not accept the enlargement operation and the reduction operation when the controller 100 does not show the first notification information 650 in the object screen.

When the controller 100 determines that the reference point designation operation is performed in the case where the user touches the detection object surface 201 with the finger based on the detection result in the fingerprint sensor 200 and the detection result in the touch panel 130, the controller 100 may accept the reference point designation operation. In this case, the controller 100 accepts the reference point designation operation when the user touches the detection object surface 201 with the finger, but does not accept the reference point designation operation when the user does not touch the detection object surface 201 with the finger. Accordingly, when the same operation as the reference point designation operation is performed on the object screen in the case where the user does not touch the detection object surface 201 with the finger, the controller 100 can execute the other processing. The controller 100 can determine whether or not the user touches the detection object surface 201 with the finger based on the fingerprint detection result.

The controller 100 may enlarge the display of the screen at a constant enlargement ratio with one slide operation performed on the detection object surface 201 regardless of the amount of sliding in the slide operation performed on the detection object surface 201. In this case, the user performs the slide operation once in the upper direction on the detection object surface 201, thereby being able to make the electronic apparatus 1 enlarge the display of the screen at the constant enlargement ratio. Then, the user performs the slide operation again in the upper direction on the detection object surface 201, thereby being able to make the electronic apparatus 1 enlarge the display of the screen again at the constant enlargement ratio.

The controller 100 may reduce the display of the screen at a constant reduction ratio with one slide operation performed on the detection object surface 201 regardless of the amount of sliding in the slide operation performed on the detection object surface 201. In this case, the user performs the slide operation once in the lower direction on the detection object surface 201, thereby being able to make the electronic apparatus 1 reduce the display of the screen at the constant reduction ratio. Then, the user performs the slide operation again in the lower direction on the detection object surface 201, thereby being able to make the electronic apparatus 1 reduce the display of the screen again at the constant reduction ratio.

The controller 100 may gradually enlarge the display of the screen while the user touches the detection object surface 201 with the finger without moving the finger away from the detection object surface 201 at all in a position of the finger where the slide operation is finished after the slide operation in the upper direction is performed on the detection object surface 201. In other words, the controller 100 may gradually increase the enlargement ratio and gradually enlarge the display of the screen while the user touches the detection object surface 201 with the finger without moving the finger away from the detection object surface 201 at all in a position of the finger where the slide operation is finished after the slide operation in the upper direction is performed on the detection object surface 201. In this case, the user continues to touch the detection object surface 201 with the finger without moving the position of the finger without moving the finger away from the detection object surface 201 at all after performing the slide operation in the upper direction on the detection object surface 201, thereby being able to make the electronic apparatus 1 gradually enlarge the display of the screen. Subsequently, the user moves the finger away from the detection object surface 201, thereby being able to make the electronic apparatus 1 finish enlarging the display of the screen.

In the similar manner, the controller 100 may gradually reduce the display of the screen while the user touches the detection object surface 201 with the finger without moving the finger away from the detection object surface 201 at all in a position of the finger where the slide operation is finished after the slide operation in the lower direction is performed on the detection object surface 201. In other words, the controller 100 may gradually reduce the reduction ratio and gradually reduce the display of the screen while the user touches the detection object surface 201 with the finger without moving the finger away from the detection object surface 201 at all in a position of the finger where the slide operation is finished after the slide operation in the lower direction is performed on the detection object surface 201. In this case, the user continues to touch the detection object surface 201 with the finger without moving the position of the finger without moving the finger away from the detection object surface 201 at all after performing the slide operation in the lower direction on the detection object surface 201, thereby being able to make the electronic apparatus 1 gradually reduce the display of the screen. Subsequently, the user moves the finger away from the detection object surface 201, thereby being able to make the electronic apparatus 1 finish reducing the display of the screen.

<Scrolling of Display of Screen>

In the present example, the user operates the detection object surface 201 with the finger, thereby being able to make the electronic apparatus 1 scroll the display of the screen displayed in the display surface 121. For example, when a map is displayed in the display surface 121, the user operates the detection object surface 201 with the finger, thereby being able to make the electronic apparatus 1 scroll the display of the map. When a webpage is displayed in the display surface 121, the user operates the detection object surface 201 with the finger, thereby being able to make the electronic apparatus 1 scroll the display of the webpage. One example of the operation of the electronic apparatus 1 in the case where the display of the screen is scrolled is described hereinafter. The scrolling of the display of the screen may be simply referred to as the scrolling in some cases hereinafter.

In the present example, in the case where the operation mode is the normal mode, when the controller 100 specifies a predetermined operation performed on the detection object surface 201, the controller 100 sets the operation mode to a scroll mode for scrolling the display of the screen in accordance with the operation performed on the detection object surface 201. This predetermined operation is referred to as a scroll mode setting operation in some cases.

Adopted as the scroll mode setting operation is, for example, the tap operation, the double tap operation, or the long tap operation (in other words, the long press operation). The scroll mode setting operation is different from the enlargement-reduction mode setting operation described above. For example, when the double tap operation is set to the enlargement-reduction mode setting operation, the long tap operation is set to the scroll mode setting operation, for example.

In the case where the operation mode is the scroll mode, when the controller 100 specifies an operation for instructing to scroll the display of the screen in the upper direction performed on the detection object surface 201 based on the fingerprint detection result, the controller 100 controls the display 120 to scroll the display of the screen in the upper direction. In the case where the operation mode is the scroll mode, when the controller 100 specifies an operation for instructing to scroll the display of the screen in the lower direction performed on the detection object surface 201 based on the fingerprint detection result, the controller 100 controls the display 120 to scroll the display of the screen in the lower direction. The scrolling in the upper direction is referred to as the up-scrolling, and the scrolling in the lower direction is referred to as the down-scrolling in some cases hereinafter. An operation for instructing to scroll the display of the screen in the upper direction is referred to as an up-scroll operation, and an operation for instructing to scroll the display of the screen in the lower direction is referred to as a down-scroll operation in some cases.

A slide operation in the upper direction is adopted as the up-scroll operation, for example. A slide operation in the lower direction is adopted as the down-scroll operation, for example. The up-scroll operation and the down-scroll operation are not limited thereto.

Figure 17:
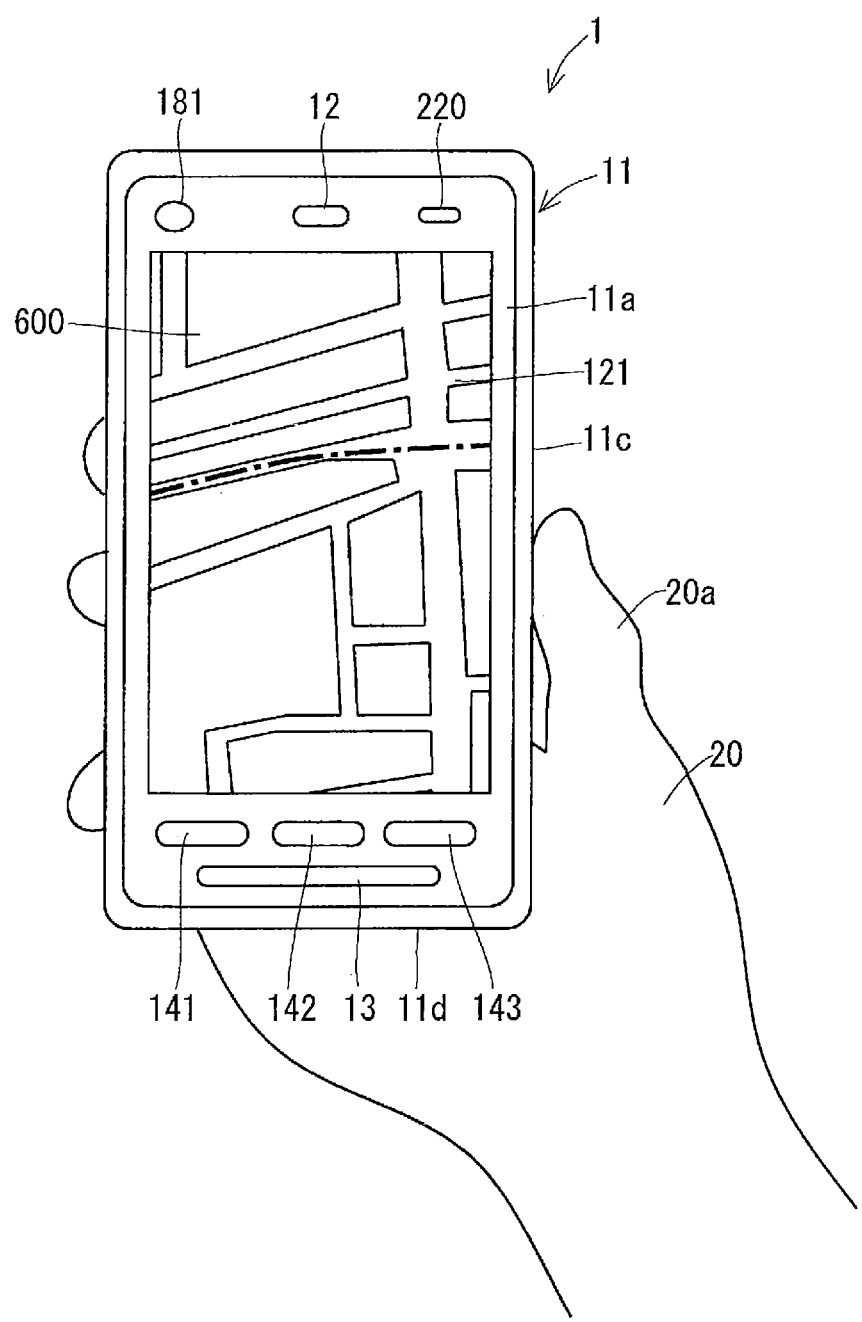
FIG. 17 illustrates a drawing showing one example of a display of the electronic apparatus.
Figure 18:
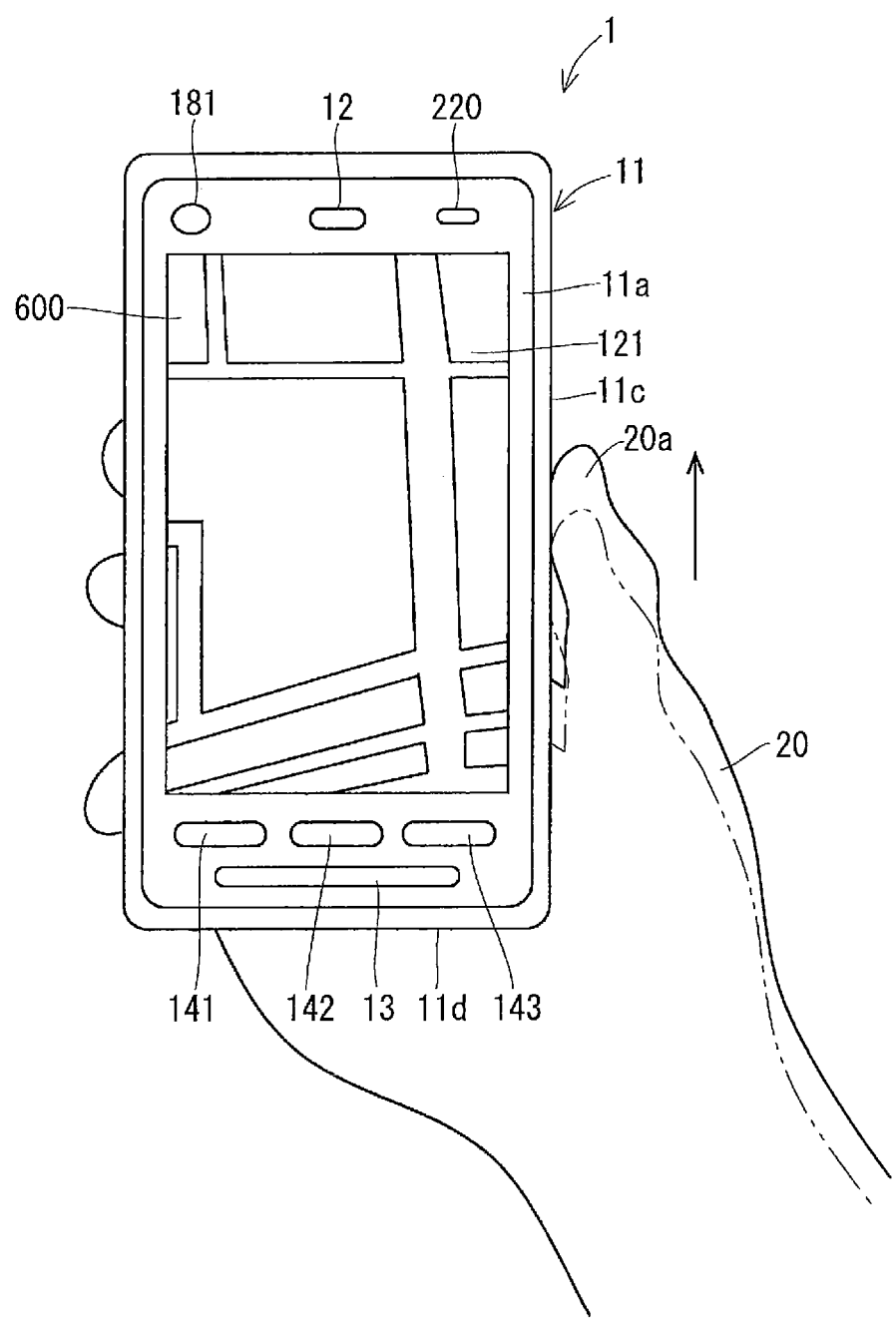
FIG. 18 illustrates a drawing showing one example of a display of the electronic apparatus.
Figure 19:
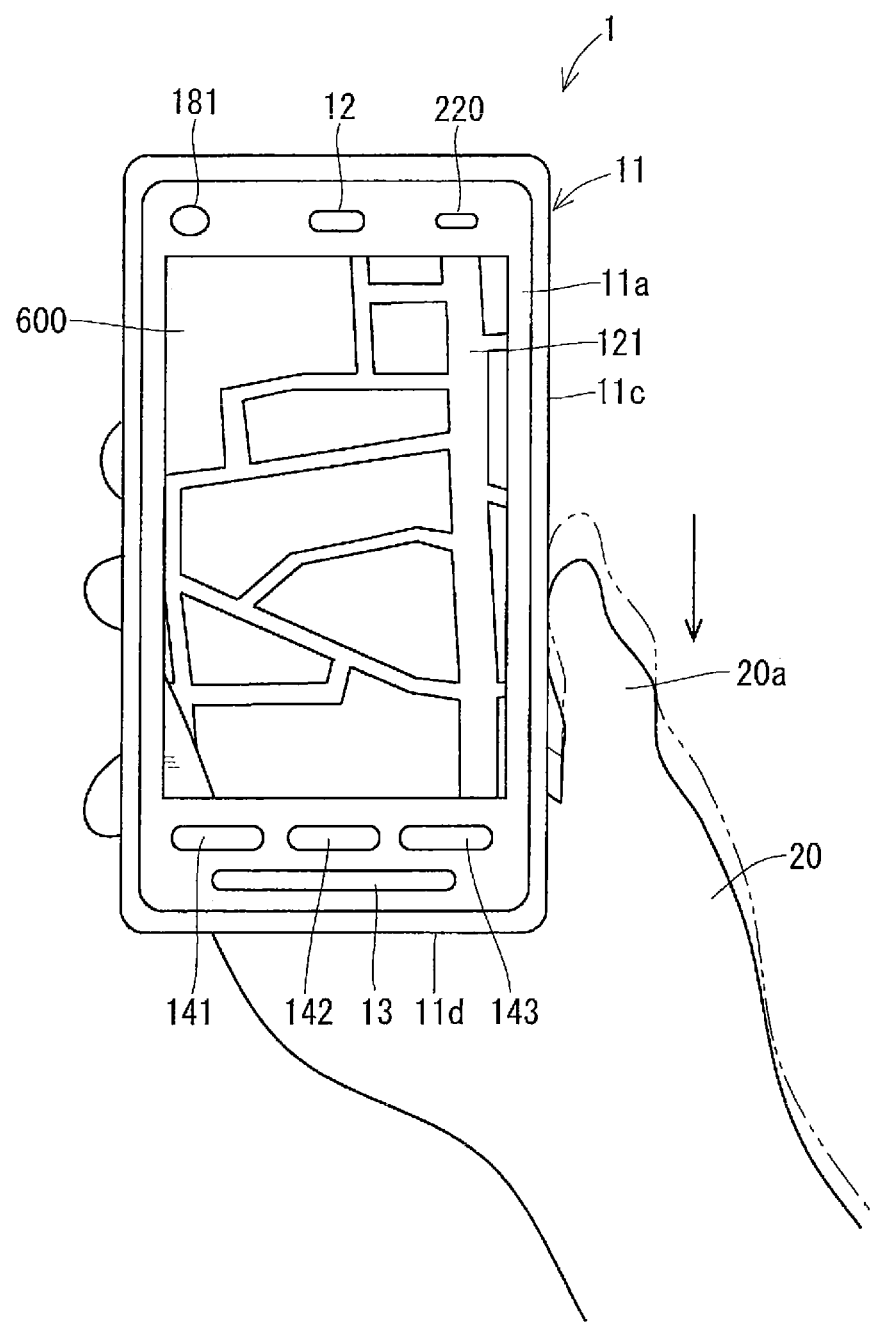
FIG. 19 illustrates a drawing showing one example of a display of the electronic apparatus.

FIGS. 17 to 19 are drawings each showing one example that the display of the map 600 displayed in the display surface 121 is scrolled. FIG. 17 shows the map 600 which has not been scrolled yet. In a state where the display of the display surface 121 is as illustrated in FIG. 17, when the slide operation in the upper direction is performed on the detection object surface 201, the display of the map 600 is up-scrolled as illustrated in FIG. 18. In the meanwhile, in the state where the display of the display surface 121 is as illustrated in FIG. 17, when the slide operation in the lower direction is performed on the detection object surface 201, the display of the map 600 is down-scrolled as illustrated in FIG. 19.

In the present example, the controller 100 continues to scroll the display of the screen in the upper direction while the user touches the detection object surface 201 with the finger without moving the finger away from the detection object surface 201 at all in a position of the finger where the slide operation is finished after the slide operation in the upper direction is performed on the detection object surface 201. Then, the controller 100 stops the up-scrolling when the finger gets away from the detection object surface 201. Accordingly, the user continues to touch the detection object surface 201 with the finger without moving the position of the finger after performing the slide operation in the upper direction on the detection object surface 201, thereby being able to make the electronic apparatus 1 continue the up-scrolling.

In the similar manner, the controller 100 continues to scroll the display of the screen in the lower direction while the user touches the detection object surface 201 with the finger without moving the finger away from the detection object surface 201 at all in a position of the finger where the slide operation is finished after the slide operation in the lower direction is performed on the detection object surface 201. Then, the controller 100 stops the down-scrolling when the finger gets away from the detection object surface 201. Accordingly, the user continues to touch the detection object surface 201 with the finger without moving the position of the finger after performing the slide operation in the lower direction on the detection object surface 201, thereby being able to make the electronic apparatus 1 continue the down-scrolling.

As described above, in the present example, when the controller 100 specifies a predetermined operation performed on the detection object surface 201 of the fingerprint sensor 200, the controller 100 scrolls the display of the screen. Accordingly, the user can make the electronic apparatus 1 scroll the display of the screen by operating the detection object surface 201. Thus, the convenience of the electronic apparatus 1 is improved.

The controller 100 may increase an amount of scrolling of the display of the screen in the upper direction in accordance with the amount of sliding of the slide operation performed in the upper direction on the detection object surface 201. In this case, the up-scrolling is finished when the slide operation in the upper direction is finished. In the similar manner, the controller 100 may increase an amount of scrolling of the display of the screen in the lower direction in accordance with the amount of sliding of the slide operation performed in the lower direction on the detection object surface 201. In this case, the down-scrolling is finished when the slide operation in the lower direction is finished.

The controller 100 may up-scroll the display of the screen by a constant amount with one slide operation in the upper direction performed on the detection object surface 201. In this case, the up-scrolling is finished when the slide operation in the upper direction is finished. In the similar manner, the controller 100 may down-scroll the display of the screen by a constant amount with one slide operation in the lower direction performed on the detection object surface 201. In this case, the down-scrolling is finished when the slide operation in the lower direction is finished.

The controller 100 may scroll the display of the object screen in the upper direction upon specifying the slide operation in the upper direction performed on the object screen regardless of whether or not the operation mode is set to the scroll mode. The controller 100 may scroll the display of the object screen in the lower direction upon specifying the slide operation in the lower direction performed on the object screen regardless of whether or not the operation mode is set to the scroll mode.

When the controller 100 sets the operation mode to the scroll mode and subsequently determines that the finger gets away from the detection object surface 201 based on the fingerprint detection result, the controller 100 may cancel the scroll mode. In the case where the operation mode is the scroll mode, when the controller 100 specifies the same operation as the scroll mode setting operation performed on the detection object surface 201, the controller 100 may cancel the scroll mode.

<Processing Using Detection Result of Inclination of Electronic Apparatus>

In the present example, the controller 100 can control the display of the screen based on the detection result in the fingerprint sensor 200 and the detection result in the accelerometer 210.

Herein, the detection result in the accelerometer 210 changes in accordance with an inclination of the electronic apparatus 1 (in other words, a posture of the electronic apparatus 1). Accordingly, the accelerometer 210 is considered as the sensor detecting the inclination of the electronic apparatus 1. Thus, it is considered that the controller 100 can control the display of the screen based on the fingerprint detection result and the detection result in the sensor detecting the inclination of the electronic apparatus 1. The detection result in the accelerometer 210 is referred to as the acceleration detection result in some cases hereinafter.

The controller 100 determines a scroll speed of the object screen based on the acceleration detection result when the controller 100 scrolls the display of the object screen based on the fingerprint detection result as described above, for example. Described hereinafter is an operation example of the electronic apparatus 1 in the case where the controller 100 determines the scroll speed of the object screen based on the acceleration detection result. When there is no need to distinguish the up-scroll operation and the down-scroll operation, each operation may be referred to as the scroll operation in some cases hereinafter.

FIG. 20 is a flow chart showing one example of an operation of the electronic apparatus 1 in the case where the operation mode is the scroll mode. In the example in FIG. 20, the controller 100 continues to scroll the display of the screen while the user touches the detection object surface 201 with the finger without moving the finger away from the detection object surface 201 at all in a position of the finger where the slide operation is finished after the slide operation which is the scroll operation is performed on the detection object surface 201. Then, the controller 100 finishes scrolling the display of the screen when the finger gets away from the detection object surface 201.

As illustrated in FIG. 20, upon specifying in Step s1 that the user touches the detection object surface 201 with the finger based on the fingerprint detection result, the controller 100 executes Step s2. In Step s2, the controller 100 obtains inclination information indicating the inclination of the electronic apparatus 1 at a time when the user touches the detection object surface 201 with the finger as initial inclination information based on the acceleration detection result. In other words, the controller 100 obtains inclination information indicating the inclination of the electronic apparatus 1 at a time of specifying in Step s1 that the user touches the detection object surface 201 with the finger as initial inclination information.

Figure 21:
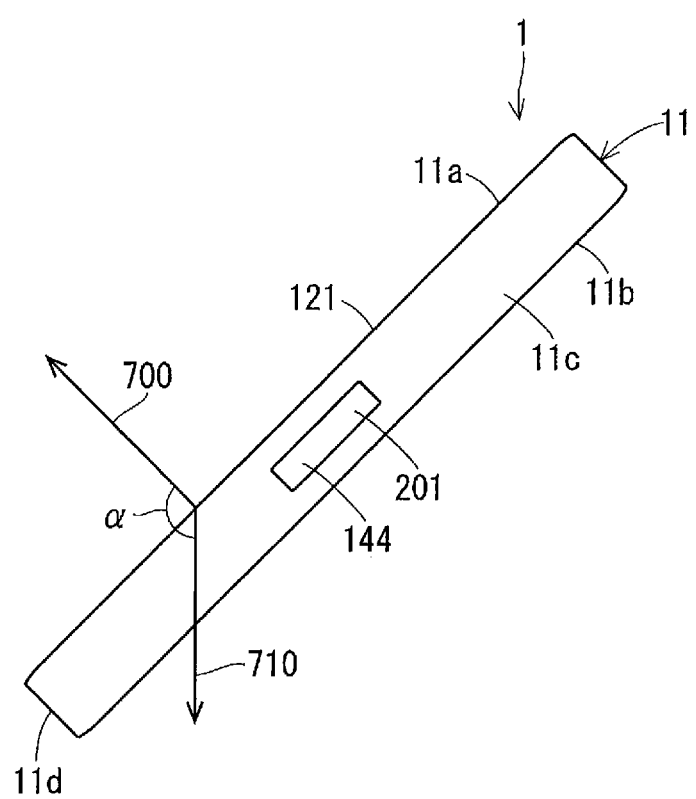
FIG. 21 illustrates a drawing for describing one example of an operation of the electronic apparatus.

At a time of specifying in Step 1 that the user touches the detection object surface 201 with the finger, as illustrated in FIG. 21, for example, the controller 100 obtains an angle α between a direction 700 perpendicular to the display surface 121 directed outside from the display surface 121 and a vertical direction (in other words, a gravity direction). Then, the controller 100 uses the obtained angle α as the initial inclination information. The angle α is referred to as the inclination angle α in some cases hereinafter. The inclination angle α used as the initial inclination information is referred to as the initial inclination angle α in some cases.

After Step s2, upon specifying the scroll operation performed on the detection object surface 201 based on the fingerprint detection result in Step s3, the controller 100 starts scrolling the display of the screen in Step s4. The scroll speed at this time is set to an initial value. Subsequently, the controller 100 executes Step s5. The controller 100 determines whether or not the user touches the detection object surface 201 with the finger in Step s5. If the determination is No in Step s5, the controller 100 finishes scrolling. In the meanwhile, if the determination is YES in Step s5, Step s7 is executed.

In Step s7, the controller 100 determines the scroll speed based on the acceleration detection result and the initial inclination information. In Step s7, the controller 100 obtains inclination information indicating a current inclination of the electronic apparatus 1 based on the acceleration detection result. Specifically, the controller 100 obtains the inclination angle α indicating the current inclination of the electronic apparatus 1, that is to say, the latest inclination angle α based on the acceleration detection result in the manner described above. Then, the controller 100 obtains a value obtained by subtracting the initial inclination angle α from the latest inclination angle α as an inclination change amount. The controller 100 determines the scroll speed based on the inclination change amount.

The controller 100 sets the scroll speed to the initial value when the inclination change amount takes zero. When the inclination change amount takes a plus value, the controller 100 sets the scroll speed to a value obtained by adding an additional value corresponding to an absolute value of the inclination change amount to the initial value. When the inclination change amount takes a minus value, the controller 100 sets the scroll speed to a value obtained by subtracting a subtracted value corresponding to an absolute value of the inclination change amount from the initial value.

After the scroll speed is determined in Step s7, Step s5 is executed again. Subsequently, the electronic apparatus 1 operates in the similar manner.

In the electronic apparatus 1 operating in the manner described above, the scroll speed is changed in accordance with the inclination of the electronic apparatus 1 specified based on the acceleration detection result while the display of the screen is scrolled. In the electronic apparatus 1, when the user touches the detection object surface 201 with the finger, the scroll speed corresponding to the inclination of the electronic apparatus 1 is changed, and when the user does not touch the detection object surface 201 with the finger, the scroll speed is not changed.

The user seeing the display surface 121 inclines the display surface 121 forward when the display of the screen is scrolled, thereby being able to make the electronic apparatus 1 reduce the scroll speed. The user seeing the display surface 121 inclines the display surface 121 backward when the display of the screen is scrolled, thereby being able to make the electronic apparatus 1 increase the scroll speed.

Figure 23:
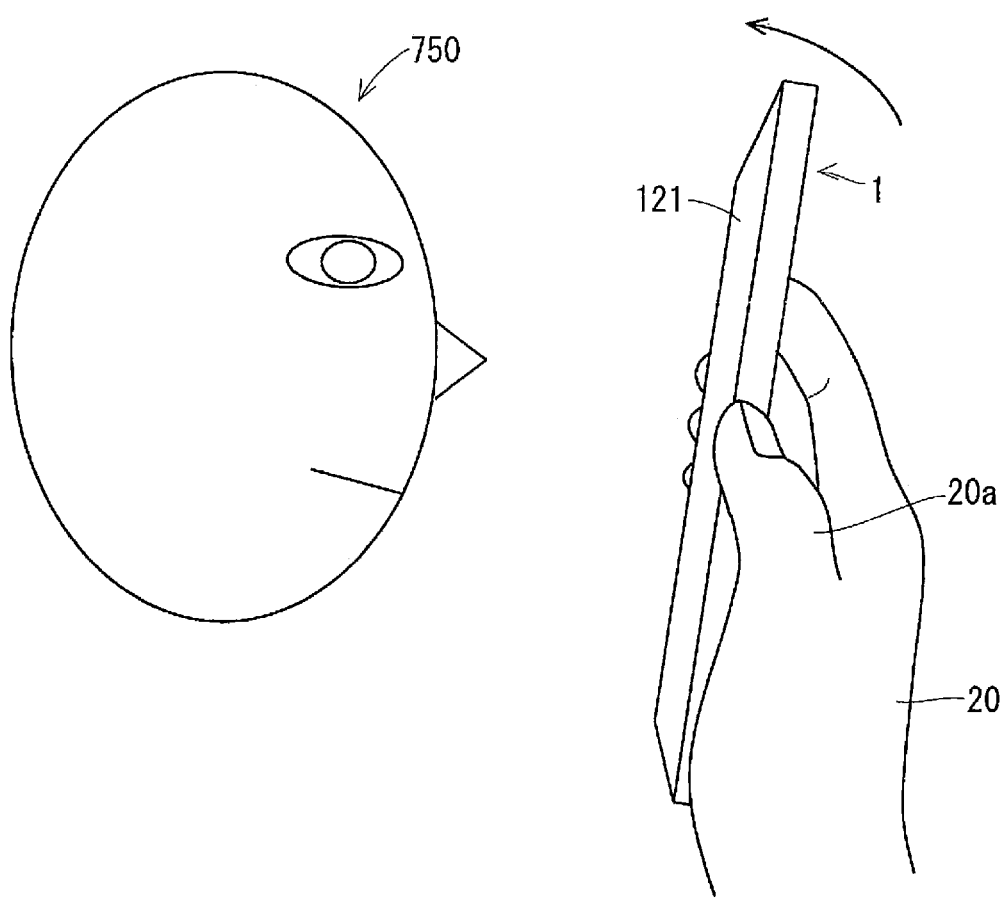
FIG. 23 illustrates a drawing showing one example of a user operating the electronic apparatus.

FIG. 22 is a drawing showing one example of a posture of the electronic apparatus 1 at the time when Step s1 is executed. When a user 750 seeing the display surface 121 of the electronic apparatus 1 illustrated in FIG. 22 inclines the display surface 121 forward as illustrated in FIG. 23, the inclination change amount obtained in Step s4 takes a minus value. Accordingly, the scroll speed gets smaller than the initial value. In the meanwhile, when the user 750 seeing the display surface 121 of the electronic apparatus 1 illustrated in FIG. 22 inclines the display surface 121 backward as illustrated in FIG. 24, the inclination change amount takes a plus value. Accordingly, the scroll speed gets larger than the initial value. The controller 100 can change the scroll speed at ten or more levels, for example, in accordance with the inclination of the electronic apparatus 1.

In the example described above, Step s7 is executed repeatedly while the display of the screen is scrolled, thus the scroll speed corresponding to the inclination of the electronic apparatus 1 is changed, however, the scroll speed needs not be changed. That is to say, if the determination is YES in Step s5, it is applicable that Step s7 is not executed but Step s5 is executed again. In this case, the scroll speed at the time of starting scrolling in Step s4 may be determined based on the initial inclination information. For example, the controller 100 may increase the scroll speed as the initial inclination angle α gets larger. Accordingly, the scroll speed is determined in accordance with the inclination of the electronic apparatus 1 at the time when the user touches the detection object surface 201 with the finger, and the scroll speed is maintained during the scrolling. For example, when the user seeing the display surface 121 performs the scroll operation on the detection object surface 201 in the state of inclining the display surface 121 forward (refer to FIG. 23), the display of the screen is scrolled at a small scroll speed. In the meanwhile, when the user seeing the display surface 121 performs the scroll operation on the detection object surface 201 in the state of inclining the display surface 121 backward (refer to FIG. 24), the display of the screen is scrolled at a large scroll speed.

As described above, in the present example, the controller 100 controls the display of the screen based on the operation on the detection object surface 201 specified based on the fingerprint detection result and the inclination of the electronic apparatus 1 specified based on the acceleration detection result. Accordingly, the electronic apparatus 1 controls the display of the screen in accordance with the operation performed by the finger on the detection object surface 201 and the inclination of the electronic apparatus 1. Thus, the convenience of the electronic apparatus 1 is improved.

The controller 100 determines the scroll speed of the display of the screen based on the detection result in the accelerometer 210, that is to say, the detection result in the sensor detecting the inclination of the electronic apparatus 1. Accordingly, the user changes the inclination of the electronic apparatus 1, thereby being able to make the electronic apparatus 1 change the scroll speed. Thus, the convenience of the electronic apparatus 1 is improved.

The controller 100 changes the scroll speed in accordance with the inclination of the electronic apparatus 1 specified based on the detection result in the accelerometer 210 when the display of the screen is scrolled. Accordingly, the user can make the electronic apparatus 1 change the scroll speed when the display of the screen is scrolled. Thus, the convenience of the electronic apparatus 1 is improved.

In the example described above, the scrolling is finished when the finger gets away from the detection object surface 201 after the scrolling is started, however, the scrolling may be maintained. In this case, the scrolling is finished when a predetermined operation (the tap operation, for example) is performed on the detection object surface 201, for example.

When the scrolling is maintained even in the case where the finger gets away from the detection object surface 201 after the scrolling is started, the controller 100 may execute Step s5 again upon determining that the determination is NO in Step s5. In this case, when the finger gets away from the detection object surface 201, the controller 100 maintains the scroll speed at the time when the finger gets away from the detection object surface 201.

When the scrolling is maintained even in the case where the finger gets away from the detection object surface 201 after the scrolling is started, the controller 100 may execute Step s7 repeatedly after Step s4 without executing Step s5. In this case, the user can make the electronic apparatus 1 change the scroll speed by changing the inclination of the electronic apparatus 1 even in the state where the user moves the finger away from the detection object surface 201.

When the scrolling is finished and then started again, the controller 100 may set, to the initial value of the scroll speed in Step s4, the scroll speed at a time when the previous scrolling is finished. Accordingly, when the scrolling is started, the display of the screen is scrolled at the scroll speed at the time when the previous scrolling is finished.

In the example described above, the controller 100 scrolls the display of the screen based on the detection result in the fingerprint sensor 200 and the detection result in the accelerometer 210, however, the controller 100 may perform the other control of the display of the screen. For example, the controller 100 may enlarge and reduce the display of the screen based on the detection result in the fingerprint sensor 200 and the detection result in the accelerometer 210. The operation of the electronic apparatus 1 in this case is described hereinafter. The increase in the size of the display of the screen is simply referred to as the display enlargement, and the decrease in the size of the display of the screen is simply referred to as the display reduction in some cases hereinafter.

FIG. 25 is a flow chart showing one example of the operation of the electronic apparatus 1 in the case where the operation mode is the enlargement-reduction mode. In the example in FIG. 25, the controller 100 gradually enlarges the display of the screen while the user touches the detection object surface 201 with the finger without moving the finger away from the detection object surface 201 at all in a position of the finger where the slide operation is finished after the slide operation in the upper direction is performed on the detection object surface 201. Then, the controller 100 finishes the display enlargement when the finger gets away from the detection object surface 201.

As illustrated in FIG. 25, upon specifying in Step s11 that the user touches the detection object surface 201 with the finger based on the fingerprint detection result, the controller 100 executes Step s12. In Step s12, the controller 100 obtains the initial inclination information in the manner similar to Step s2 described above.

After Step s12, upon specifying the enlargement operation performed on the detection object surface 201 based on the fingerprint detection result in Step s13, the controller 100 starts the display enlargement in Step s14. A display enlargement speed at this time is set to an initial value. When the display of the screen is gradually enlarged, the enlargement ratio gradually increases. The display enlargement speed is considered as a change speed of the enlargement ratio in the case where the display of the screen is gradually enlarged. The change speed of the enlargement ratio is considered as a change amount of the enlargement ratio in a predetermined period of time. The display enlargement speed is simply referred to as the enlargement speed in some cases hereinafter.

After Step s14, the controller 100 executes Step s15. The controller 100 determines whether or not the user touches the detection object surface 201 with the finger in Step s15. If the determination is No in Step s15, the controller 100 finishes the display enlargement. In the meanwhile, if the determination is YES in Step s15, Step s17 is executed.

In Step s17, the controller 100 determines the enlargement speed based on the acceleration detection result and the initial inclination information. In Step s17, the controller 100 obtains the inclination change amount described above. Then, the controller 100 determines the enlargement speed based on the inclination change amount. The controller 100 sets the enlargement speed to the initial value when the inclination change amount takes zero. When the inclination change amount takes a plus value, the controller 100 sets the enlargement speed to a value obtained by adding an additional value corresponding to an absolute value of the inclination change amount to the initial value. When the inclination change amount takes a minus value, the controller 100 sets the enlargement speed to a value obtained by subtracting a subtracted value corresponding to an absolute value of the inclination change amount from the initial value.

After the enlargement speed is determined in Step s17, Step s15 is executed again. Subsequently, the electronic apparatus 1 operates in the similar manner.

In the electronic apparatus 1 operating in the manner described above, the enlargement speed is changed in accordance with the inclination of the electronic apparatus 1 specified based on the acceleration detection result while the display of the screen is enlarged. In the electronic apparatus 1, when the user touches the detection object surface 201 with the finger, the enlargement speed corresponding to the inclination of the electronic apparatus 1 is changed, and when the user does not touch the detection object surface 201 with the finger, the enlargement speed is not changed.

The user seeing the display surface 121 inclines the display surface 121 forward when the display of the screen is gradually enlarged (refer to FIG. 23), thereby being able to make the electronic apparatus 1 reduce the enlargement speed. That is to say, the user seeing the display surface 121 inclines the display surface 121 forward, thereby being able to make the electronic apparatus 1 gradually enlarge the display of the screen. In the meanwhile, the user seeing the display surface 121 inclines the display surface 121 backward when the display of the screen is gradually reduced (refer to FIG. 24), thereby being able to make the electronic apparatus 1 increase the enlargement speed. That is to say, the user seeing the display surface 121 inclines the display surface 121 forward, thereby being able to make the electronic apparatus 1 rapidly enlarge the display of the screen. The controller 100 can change the enlargement speed at ten or more levels, for example, in accordance with the inclination of the electronic apparatus 1.

The controller 100 can determine a display reduction speed in accordance with the inclination of the electronic apparatus 1 in the similar manner also in the case where the controller 100 gradually reduces the display of the screen. The display reduction speed is simply referred to as the reduction speed in some cases hereinafter.

In the example described above, Step s17 is executed repeatedly while the display enlargement is performed, thus the enlargement speed corresponding to the inclination of the electronic apparatus 1 is changed, however, the enlargement speed needs not be changed. That is to say, if the determination is YES in Step s15, it is applicable that Step s17 is not executed but Step s15 is executed again. In this case, the enlargement speed at the time of starting the display enlargement in Step s14 may be determined based on the initial inclination information. For example, the controller 100 may increase the enlargement speed as the initial inclination angle α gets larger. Accordingly, the enlargement speed is determined in accordance with the inclination of the electronic apparatus 1 at the time when the user touches the detection object surface 201 with the finger, and the enlargement speed is maintained during the display enlargement. For example, when the user seeing the display surface 121 performs the enlargement operation on the detection object surface 201 in the state of inclining the display surface 121 forward (refer to FIG. 23), the display of the screen is gradually enlarged at a small enlargement speed. In the meanwhile, when the user seeing the display surface 121 performs the scroll operation on the detection object surface 201 in the state of inclining the display surface 121 backward (refer to FIG. 24), the display of the screen is gradually enlarged at a large enlargement speed. The same applies to a case of the display reduction.

As described above, in the present example, the controller 100 determines the enlargement speed and the reduction speed based on the detection result in the sensor detecting the inclination of the electronic apparatus 1. Accordingly, the user changes the inclination of the electronic apparatus 1, thereby being able to make the electronic apparatus 1 change the enlargement speed and the reduction speed. Thus, the convenience of the electronic apparatus 1 is improved.

The controller 100 changes the enlargement speed or the reduction speed in accordance with the inclination of the electronic apparatus 1 specified based on the detection result in the accelerometer 210 during the display enlargement or the display reduction. Accordingly, the user can make the electronic apparatus 1 change the enlargement speed or the reduction speed when the display of the screen is gradually enlarged or reduced. Thus, the convenience of the electronic apparatus 1 is improved.

In the example described above, the display enlargement is finished when the finger gets away from the detection object surface 201 after the display enlargement is started, however, the display enlargement may be maintained. In this case, the display enlargement is finished when a predetermined operation (the tap operation, for example) is performed on the detection object surface 201, for example. The same applies to a case of the display reduction.

When the display enlargement is maintained even in the case where the finger gets away from the detection object surface 201 after the display enlargement is started, the controller 100 may execute Step s15 again upon determining that the determination is NO in Step s15. In this case, when the finger gets away from the detection object surface 201, the controller 100 maintains the enlargement speed at the time when the finger gets away from the detection object surface 201. The same applies to a case of the display reduction.

When the display enlargement is maintained even in the case where the finger gets away from the detection object surface 201 after the display enlargement is started, the controller 100 may execute Step s17 repeatedly after Step s14 without executing Step s15. In this case, the user can make the electronic apparatus 1 change the enlargement speed by changing the inclination of the electronic apparatus 1 even in the state where the user moves the finger away from the detection object surface 201. The same applies to a case of the display reduction.

When the display enlargement is finished and then started again, the controller 100 may set, to the initial value of the enlargement speed in Step s14, the enlargement speed at a time when the previous display enlargement is finished. Accordingly, when the display enlargement is started, the display enlargement is performed at the enlargement speed at the time when the previous display enlargement is finished. The same applies to a case of the display reduction.

In the present example, the accelerometer 210 is used as the sensor detecting the inclination of the electronic apparatus 1, however, the other sensor may be used. For example, a gyro sensor may be used as the sensor detecting the inclination of the electronic apparatus 1. The accelerometer 210 and the gyro sensor may be used as the sensors detecting the inclination of the electronic apparatus 1.

<Processing Using Detection Result of Gesture of User>

In the present example, the controller 100 can control the display of the screen based on the detection result in the fingerprint sensor 200 and the detection result in the proximity sensor 220.

Figure 26:
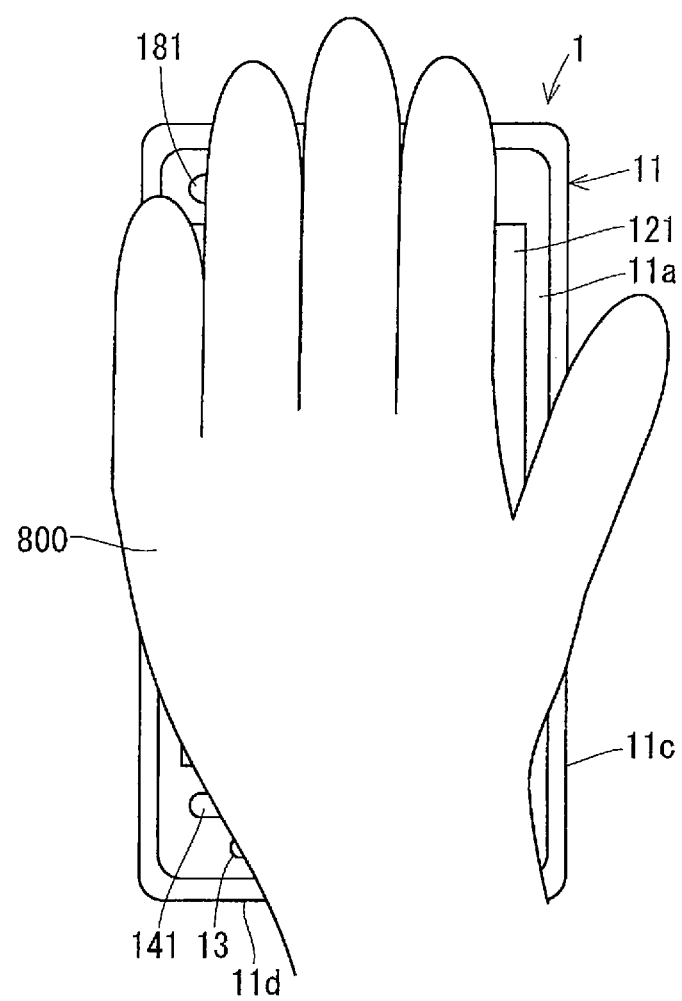
FIG. 26 illustrates a drawing showing one example of a user operating the electronic apparatus.

Herein, as illustrated in FIG. 26, when the user makes a gesture using a hand 800 in front of the proximity sensor 220 exposed from the front surface of the electronic apparatus 1, the detection result in the proximity sensor 200 changes in accordance with the gesture. Accordingly, the proximity sensor 220 is considered as a sensor detecting the gesture made by the user. Thus, it is considered that the controller 100 can control the display of the screen based on the fingerprint detection result and the detection result in the sensor detecting the gesture made by the user. The detection result in the proximity sensor 220 is referred to as the proximity detection result in some cases hereinafter. The gesture means the gesture made by the user's hand performed in front of the proximity sensor 220 unless otherwise noted.

In the present example, the controller 100 can specify various gestures based on the proximity detection result. For example, the controller 100 can specify, based on the proximity detection result, an upward gesture made by the user's hand moving in the upper direction, a downward gesture made by the hand moving in the lower direction, a rightward gesture made by the hand moving in the right direction, and a leftward gesture made by the hand moving in the left direction. The controller 100 can specify, based on the proximity detection result, a clockwise circle gesture made by the user's hand moving clockwise along the display surface 121 in a circular pattern and a counterclockwise circle gesture made by the user's hand moving counterclockwise along the display surface 121 in a circular pattern. The controller 100 can specify, based on the proximity detection result, a close gesture made by the user's hand getting close to the display surface 121 along a direction perpendicular to the display surface 121 and a faraway gesture made by the user's hand getting away from the display surface 121 along the direction described above. The type of the gesture specified by the controller 100 is not limited thereto. The controller 100 may specify the gesture made by a portion other than the user's hand.

The controller 100 controls the display of the screen based on the operation on the detection object surface 201 specified based on the fingerprint detection result and the gesture specified based on the proximity detection result. The controller 100 determines whether or not the user touches the detection object surface 201 with the finger based on the fingerprint detection result as described above, for example. In other words, the controller 100 determines whether or not the operation of touching the detection object surface 201 with the finger is performed based on the fingerprint detection result. Then, when the controller 100 specifies a predetermined gesture based on the proximity detection result in the case where the user touches the detection object surface 201 with the finger, the controller 100 scrolls the display of the screen. Specifically, when the controller 100 specifies an up-scroll gesture for instructing to perform the up-scrolling in the case where the user touches the detection object surface 201 with the finger, the controller 100 up-scrolls the display of the screen. At this time, the controller 100 up-scrolls the display of the screen by a predetermined amount, for example. When the controller 100 specifies a down-scroll gesture for instructing to perform the down-scrolling in the case where the user touches the detection object surface 201 with the finger, the controller 100 down-scrolls the display of the screen. At this time, the controller 100 down-scrolls the display of the screen by a predetermined amount, for example. The upward gesture is adopted as the up-scroll gesture, for example, and the downward gesture is adopted as the down-scroll gesture, for example. When there is no need to particularly distinguish the up-scroll gesture and the down-scroll gesture, each gesture may be simply referred to as the scroll gesture in some cases hereinafter.

When the controller 100 specifies a predetermined gesture based on the proximity detection result in the case where the user touches the detection object surface 201 with the finger, the controller 100 can enlarge or reduce the display of the screen. Specifically, when the controller 100 specifies the enlargement gesture for instructing to perform the display enlargement in the case where the user touches the detection object surface 201 with the finger, the controller 100 enlarges the display of the screen. At this time, for example, the controller 100 enlarges the display of the screen at a constant magnification ratio (1.5 times, for example). When the controller 100 specifies a reduction gesture for instructing to perform the display reduction in the case where the user touches the detection object surface 201 with the finger, the controller 100 reduces the display of the screen. At this time, for example, the controller 100 reduces the display of the screen at a constant magnification ratio (half times, for example). The leftward gesture is adopted as the enlargement gesture, for example, and the rightward gesture is adopted as the reduction gesture, for example.

The up-scroll gesture, the down-scroll gesture, the enlargement gesture, and the reduction gesture are not limited to the examples described above. For example, up-scroll gesture and the down-scroll gesture may be the clockwise circle gesture and a counterclockwise circle gesture, respectively. The enlargement gesture and the reduction gesture may be the close gesture and the faraway gesture, respectively.

As described above, in the present example, the controller 100 controls the display of the screen based on the operation on the detection object surface 201 specified based on the fingerprint detection result and the gesture specified based on the proximity detection result. Accordingly, the electronic apparatus 1 controls the display of the screen in accordance with the operation performed by the finger on the detection object surface 201 and the gesture performed by the user. Thus, the convenience of the electronic apparatus 1 is improved.

Figure 27:
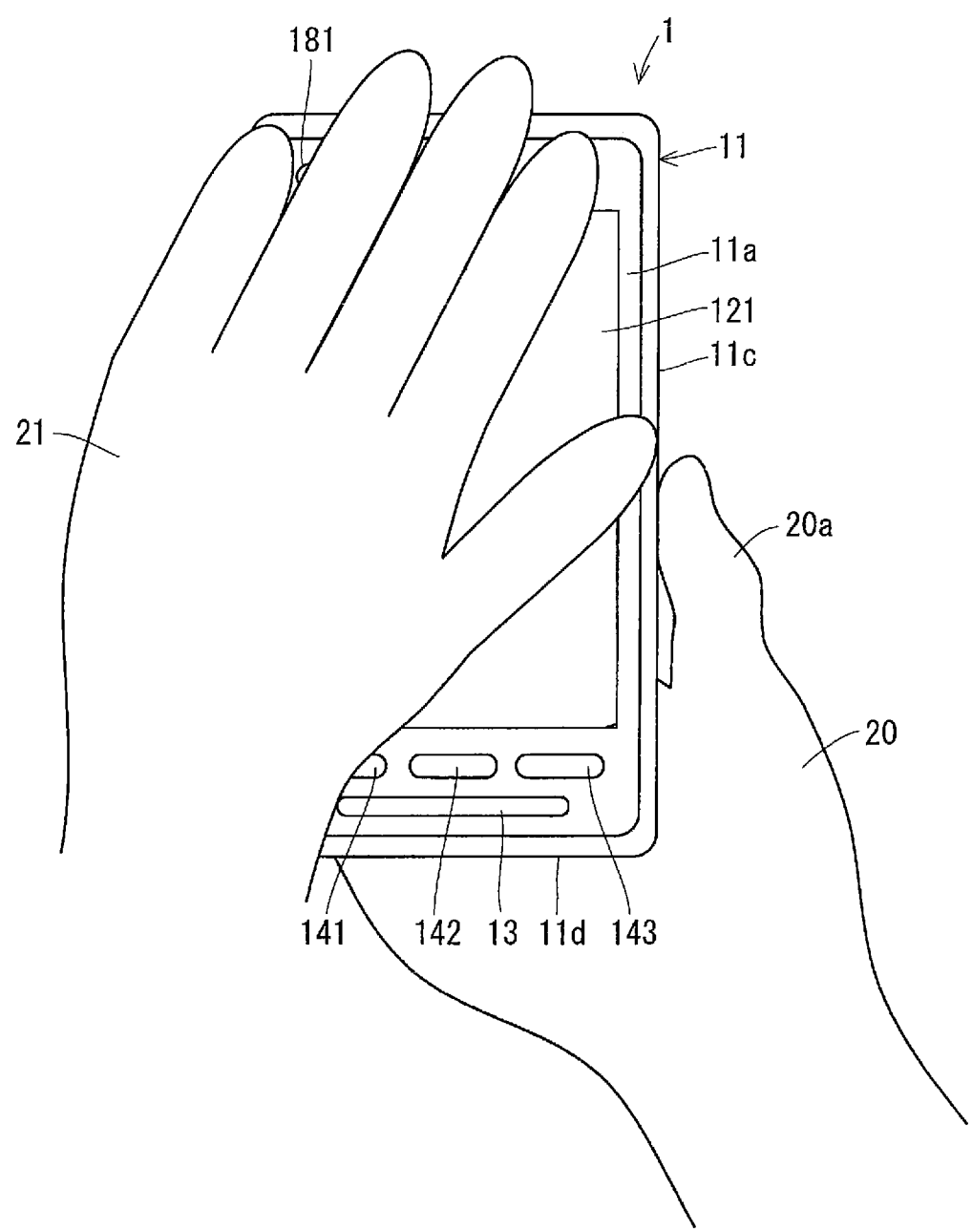
FIG. 27 illustrates a drawing showing one example of a user operating the electronic apparatus.

When the controller 100 specifies a predetermined gesture in the case where the user touches the detection object surface 201 with the finger, the controller 100 scrolls the display of the screen. Accordingly, the user can make the electronic apparatus 1 scroll the display of the screen by making the gesture while touching the detection object surface 201 with the finger. For example, as illustrated in FIG. 27, the user holding the electronic apparatus 1 in the right hand 20 makes the gesture with the left hand 21 while touching the detection object surface 201 with the thumb 20a of the right hand 20, thereby being able to make the electronic apparatus 1 scroll the display of the screen.

When the controller 100 specifies a predetermined gesture in the case where the user touches the detection object surface 201 with the finger, the controller 100 enlarges or reduces the display of the screen. Accordingly, the user can make the electronic apparatus 1 enlarge or reduce the display of the screen by making the gesture while touching the detection object surface 201 with the finger.

The controller 100 may change the amount of scrolling corresponding to the scroll gesture in accordance with the fingerprint detected in the fingerprint sensor 200 at the time when the scroll gesture is performed. FIG. 28 is a flow chart illustrating one example of the operation of the electronic apparatus 1 in this case. In the example in FIG. 28, the storage 103 stores plural pieces of reference fingerprint information. In the storage 103, each of a plurality of setting values, which are different from each other, for the amount of scrolling are associated with each of the plural pieces of reference fingerprint information.

As illustrated in FIG. 28, upon specifying in Step s21 that the user touches the detection object surface 201 with the finger based on the fingerprint detection result, the controller 100 executes Step s22. In Step s22, the controller 100 obtains the detected fingerprint information from the fingerprint sensor 200.

Next, in Step s23, the controller 100 determines the amount of scrolling based on the obtained detected fingerprint information. Specifically, the controller 100 specifies the reference fingerprint information similar to the detected fingerprint information from the plural pieces of reference fingerprint information in the storage 103. Then, the controller 100 obtains the setting value associated with the specified reference fingerprint information from the storage 103. The controller 100 determines the obtained setting value as the amount of scrolling. Accordingly, the amount of scrolling is determined in accordance with the fingerprint detected in the fingerprint sensor 200. The storage 103 also stores the setting value of the amount of scrolling in the case where there is no reference fingerprint information similar to the detected fingerprint information in the plural pieces of reference fingerprint information. Accordingly, the controller 100 can determine the amount of scrolling even when there is no reference fingerprint information similar to the detected fingerprint information in the plural pieces of reference fingerprint information.

After Step s23, the controller 100 executes Step s25 upon specifying the scroll gesture based on the proximity detection result. In Step s25, the controller 100 scrolls the display of the screen by the amount of scrolling determined in Step s23.

As described above, the controller 100 changes the amount of scrolling in accordance with the fingerprint detected in the fingerprint sensor 200 at the time when the scroll gesture is performed, thus the convenience of the electronic apparatus 1 is improved. Considered, for example, is a case where the storage 103 stores plural pieces of reference fingerprint information indicating fingerprints of a plurality of fingers of the same user, respectively. In this case, the user can make the electronic apparatus 1 change the amount of scrolling by changing the finger with which the user touches the detection object surface 201. Considered as another example is a case where the storage 103 stores plural pieces of reference fingerprint information indicating fingerprints of fingers of a plurality of users, respectively. In this case, the electronic apparatus 1 can change the amount of scrolling for each user.

Figure 29:
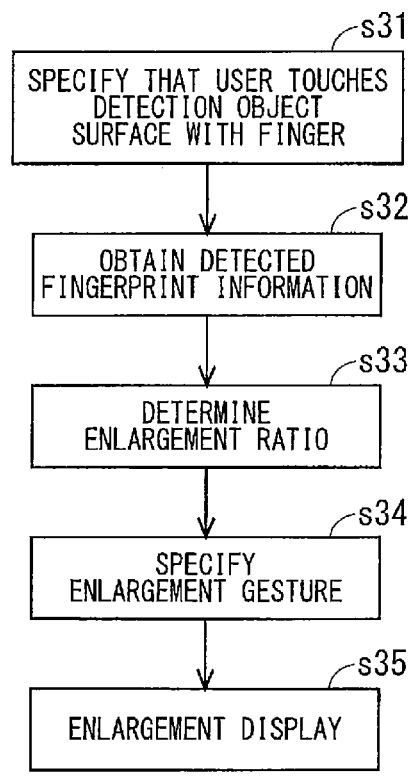
FIG. 29 illustrates a flow chart showing one example of an operation of the electronic apparatus.

The controller 100 may change the enlargement ratio of the display enlargement corresponding to the enlargement gesture in accordance with the fingerprint detected in the fingerprint sensor 200 at the time when the enlargement gesture is performed. FIG. 29 is a flow chart illustrating one example of the operation of the electronic apparatus 1 in this case. In the example in FIG. 29, the storage 103 stores plural pieces of reference fingerprint information. In the storage 103, each of a plurality of setting values, which are different from each other, for the enlargement ratio are associated with each of the plural pieces of reference fingerprint information.

As illustrated in FIG. 29, upon specifying in Step s31 that the user touches the detection object surface 201 with the finger based on the fingerprint detection result, the controller 100 executes Step s32. In Step s32, the controller 100 obtains the detected fingerprint information from the fingerprint sensor 200.

Next, in Step s33, the controller 100 determines the enlargement ratio based on the obtained detected fingerprint information. Specifically, the controller 100 specifies the reference fingerprint information similar to the detected fingerprint information from the plural pieces of reference fingerprint information in the storage 103. Then, the controller 100 obtains the setting value of the enlargement ratio associated with the specified reference fingerprint information from the storage 103. The controller 100 determines the obtained setting value as the enlargement ratio. Accordingly, the enlargement ratio is determined in accordance with the fingerprint detected in the fingerprint sensor 200. The storage 103 also stores the setting value of the enlargement ratio in the case where there is no reference fingerprint information similar to the detected fingerprint information in the plural pieces of reference fingerprint information. Accordingly, the controller 100 can determine the enlargement ratio even when there is no reference fingerprint information similar to the detected fingerprint information in the plural pieces of reference fingerprint information.

After Step s33, the controller 100 executes Step s35 upon specifying the enlargement gesture based on the proximity detection result. In Step s35, the controller 100 enlarges the display of the screen by the enlargement ratio determined in Step s33.

As described above, the controller 100 changes the enlargement ratio in accordance with the fingerprint detected in the fingerprint sensor 200 at the time when the enlargement gesture is performed, thus the user can make the electronic apparatus 1 change the enlargement ratio by changing the finger with which the user touches the detection object surface 201. The electronic apparatus 1 can change the enlargement ratio for each user. In the similar manner, the controller 100 may change the reduction ratio of the display reduction corresponding to the reduction gesture in accordance with the fingerprint detected in the fingerprint sensor 200 at the time when the reduction gesture is performed.

The controller 100 may make the amount of scrolling corresponding to the scroll gesture and the amount of scrolling corresponding to the scroll operation performed on the detection object surface 201 different from each other. Considered, for example, is a case where the controller 100 scrolls the display of the screen by a constant amount with one slide operation performed on the detection object surface 201. In this case, the controller 100 may make the amount of scrolling corresponding to the scroll gesture larger than the amount of scrolling corresponding to the scroll operation performed on the detection object surface 201. Accordingly, the user can select the amount of scrolling depending on whether to perform the scroll gesture or perform the scroll operation. Thus, the convenience of the electronic apparatus 1 is improved.

The controller 100 may make the enlargement ratio of the display enlargement corresponding to the enlargement gesture and the enlargement ratio of the display enlargement corresponding to the enlargement operation performed on the detection object surface 201 different from each other. Considered, for example, is a case where the controller 100 enlarges the display of the screen at a constant magnification ratio with one enlargement operation performed on the detection object surface 201. In this case, the controller 100 may make the constant enlargement ratio of the display enlargement corresponding to the enlargement gesture larger than the constant enlargement ratio of the display enlargement corresponding to the enlargement operation performed on the detection object surface 201. The controller 100 may make the reduction ratio of the display reduction corresponding to the reduction gesture and the reduction ratio of the display reduction corresponding to the reduction operation performed on the detection object surface 201 different from each other.

In the example described above, the electronic apparatus 1 executes the processing of controlling the display of the screen in accordance with the operation performed on the detection object surface 201, however, the electronic apparatus 1 needs not execute the processing.

In the example described above, the electronic apparatus 1 executes the processing of controlling the display of the screen in accordance with the inclination of the electronic apparatus 1, however, the electronic apparatus 1 needs not execute the processing.

In the example described above, the electronic apparatus 1 executes the processing of controlling the display of the screen in accordance with the gesture of the user, however, the electronic apparatus 1 needs not execute the processing.

<Another Example>

Figure 30:
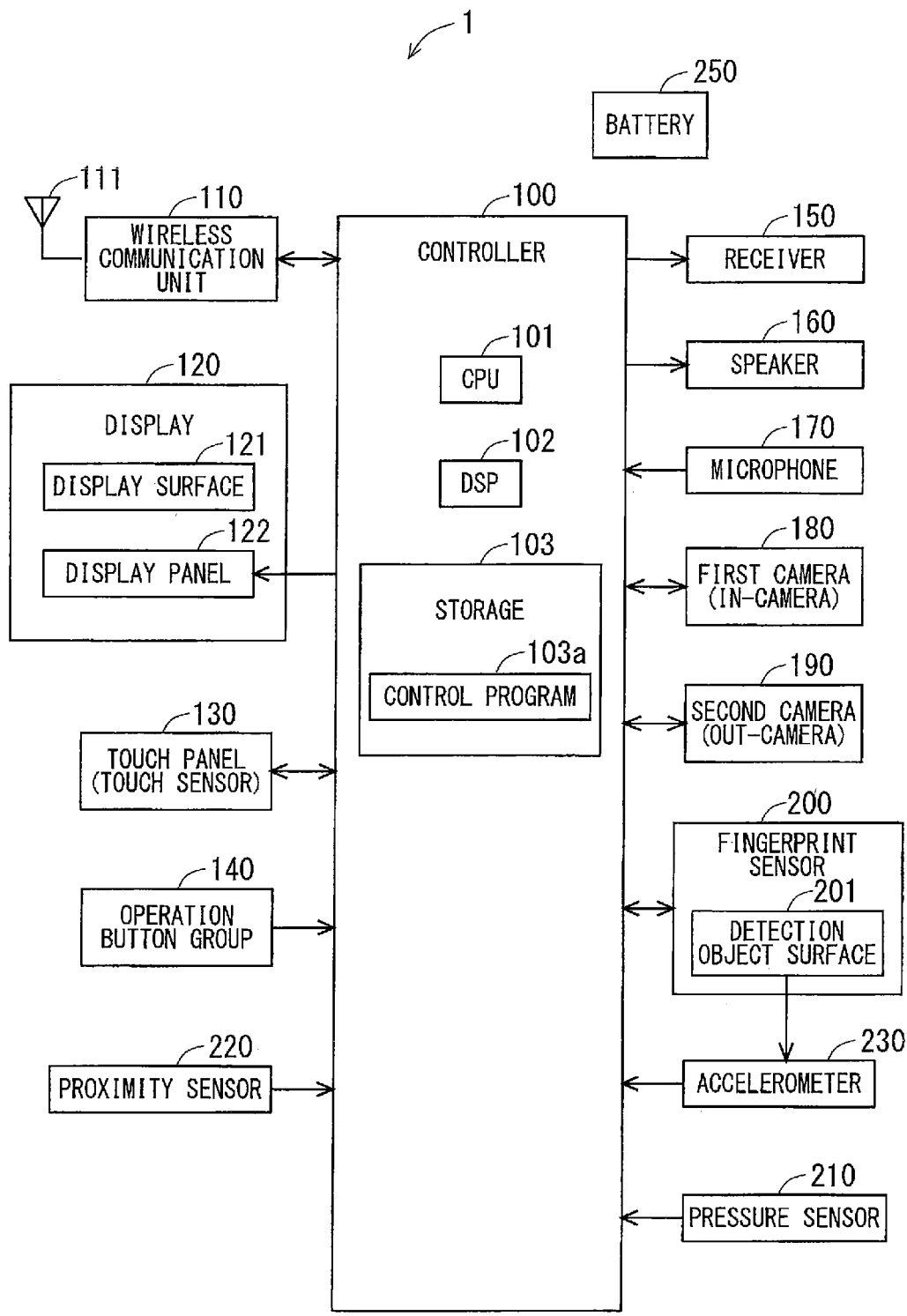
FIG. 30 illustrates a block diagram showing one example of a configuration of the electronic apparatus.

Another example of the electronic apparatus 1 is described below. FIG. 30 is a block diagram showing another example of a configuration of the electronic apparatus 1. The electronic apparatus 1 illustrated in FIG. 30 further comprises a pressure sensor 230, differing from the electronic apparatus 1 illustrated in FIG. 6 described above. The pressure sensor 230 can detect a pressure on the detection object surface 201.

In the present example, the controller 100 can control the display of the screen based on the operation performed on the detection object surface 201 specified based on the fingerprint detection result and a pressure on the detection object surface 201 specified based on the detection result in the pressure sensor 230. Accordingly, the user can make the electronic apparatus 1 control the display of the screen in accordance with the operation performed by the finger on the detection object surface 201 and the pressure on the detection object surface 201 at the time when the user touches the detection object surface 201 with the finger. Thus, the convenience of the electronic apparatus 1 is improved. The present example is described in detail below. The detection result in the pressure sensor 230 is referred to as the pressure detection result in some cases hereinafter.

As described above, in the case where the operation mode is the scroll mode, when the controller 100 specifies the scroll operation performed on the detection object surface 201 based on the fingerprint detection result, the controller 100 scrolls the display of the screen. Then, the controller 100 changes the scroll speed of the display of the screen in accordance with the pressure on the detection object surface 201 specified based on the pressure detection result.

Figure 31:
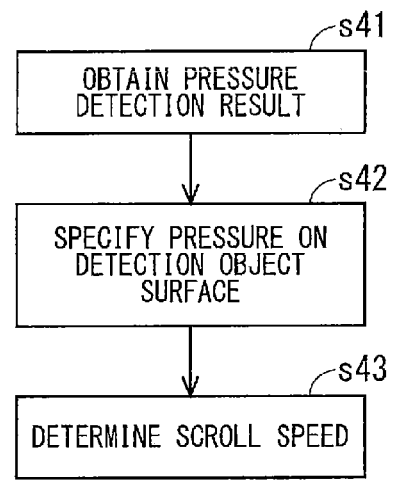
FIG. 31 illustrates a flow chart showing one example of an operation of the electronic apparatus.

FIG. 31 is a flow chart showing an operation example of the electronic apparatus 1 in the case where the controller 100 changes the scroll speed in accordance with the pressure on the detection object surface 201. The controller 100 executes a series of processing illustrated in FIG. 31 repeatedly when the controller 100 scrolls the display of the screen.

In the example in FIG. 31, the controller 100 continues to scroll the display of the screen while the user touches the detection object surface 201 with the finger without moving the finger away from the detection object surface 201 at all in a position of the finger where the slide operation is finished after the slide operation which is the scroll operation is performed on the detection object surface 201. Then, the controller 100 finishes scrolling the display of the screen when the finger gets away from the detection object surface 201. In the example in FIG. 31, the controller 100 sets the scroll speed to an initial value when the controller 100 starts scrolling.

When the display of the screen is scrolled, as illustrated in FIG. 31, the controller 100 obtains the pressure detection result from the pressure sensor 230 in Step s41. Next, in Step s42, the controller 100 specifies the pressure on the detection object surface 201 based on the obtained pressure detection result. The pressure on the detection object surface 201 which the controller specifies based on the pressure detection result is referred to as the specified pressure in some cases hereinafter.

Next, in Step s43, the controller 100 determines the scroll speed based on the specified pressure. Accordingly, the scroll speed is updated. In Step s43, the controller 100 sets a first setting value as the scroll speed when the specified pressure is equal to or smaller than a threshold value, for example. In the meanwhile, the controller 100 sets a second setting value as the scroll speed when the specified pressure is larger than the threshold value. The second setting value is set to a value larger than the first setting value, for example. The first setting value is set to the same value as the initial value, for example.

The controller 100 may set the scroll speed at three or more levels in accordance with the specified pressure using the two or more threshold values compared with the specified pressure. Considered, for example, is a case where the controller 100 can set the scroll speed at four levels. In this case, the controller 100 sets the first setting value as the scroll speed when the specified pressure is equal to or smaller than the first threshold value. The controller 100 sets the second setting value (>the first setting value) as the scroll speed when the specified pressure is larger than the first threshold value and is equal to or smaller than a second threshold value (>the first threshold value). The controller 100 sets a third setting value (>the second setting value) as the scroll speed when the specified pressure is larger than the second threshold value and is equal to or smaller than a third threshold value (>the second threshold value). Then, the controller 100 sets a fourth setting value (>the third setting value) as the scroll speed when the specified pressure is larger than the third threshold value.

As described above, the scroll speed is changed in accordance with the specified pressure, thus the user can make the electronic apparatus 1 change the scroll speed by changing the pressure on the detection object surface 201 at the time of touching the detection object surface 201 with the finger. Thus, the convenience of the electronic apparatus 1 is improved.

The controller 100 may show second notification information indicating a current scroll speed in the screen when the controller 100 scrolls the display of the screen. At this time, the controller 100 may show the second notification information semi-transparently in the screen so that a portion below the second notification information in the screen is transparently seen. Alternatively, the controller 100 may show the second notification information in the screen so that a portion below the second notification information in the screen is not seen.

Figure 32:
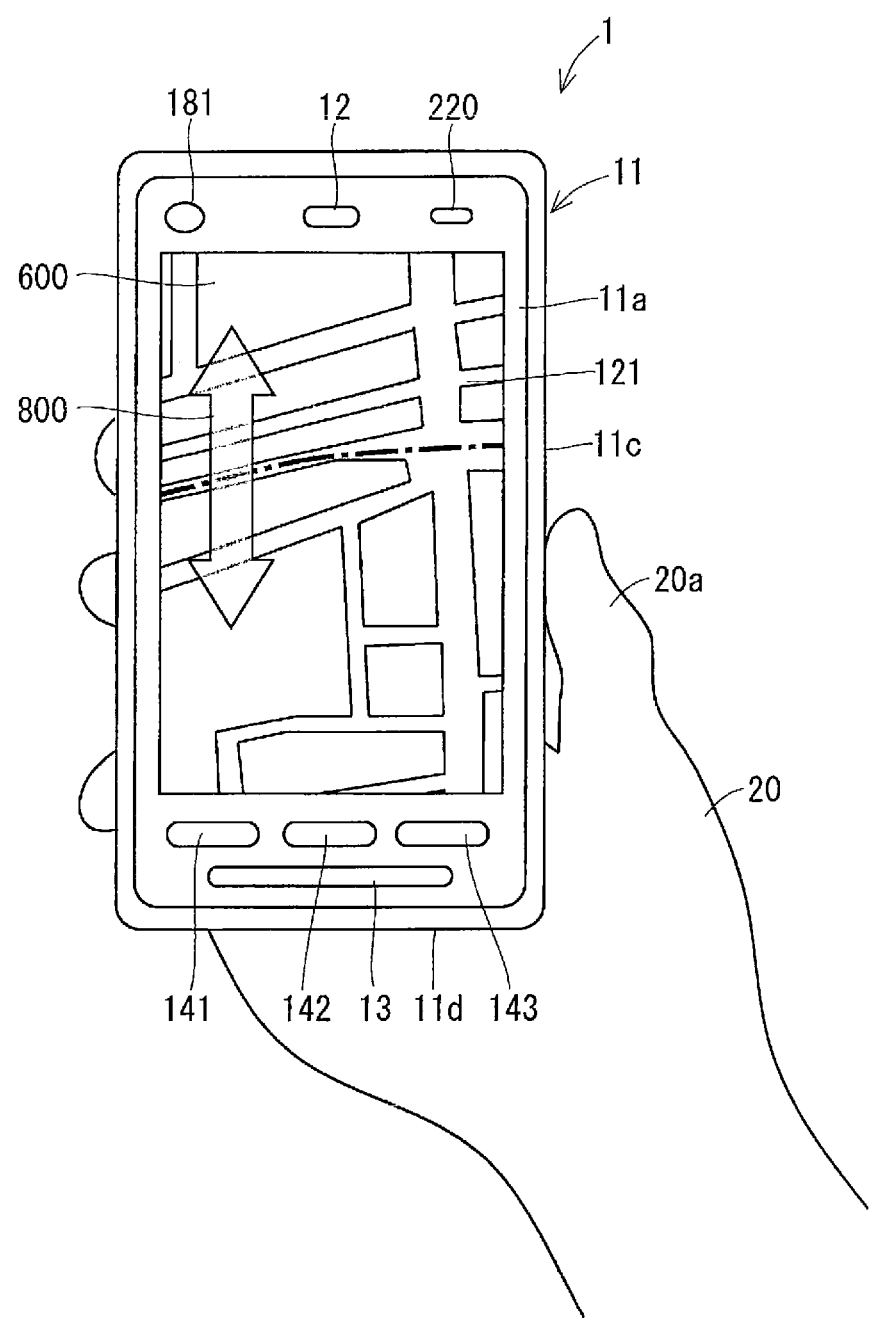
FIG. 32 illustrates a drawing showing one example of a display of the electronic apparatus.
Figure 33:
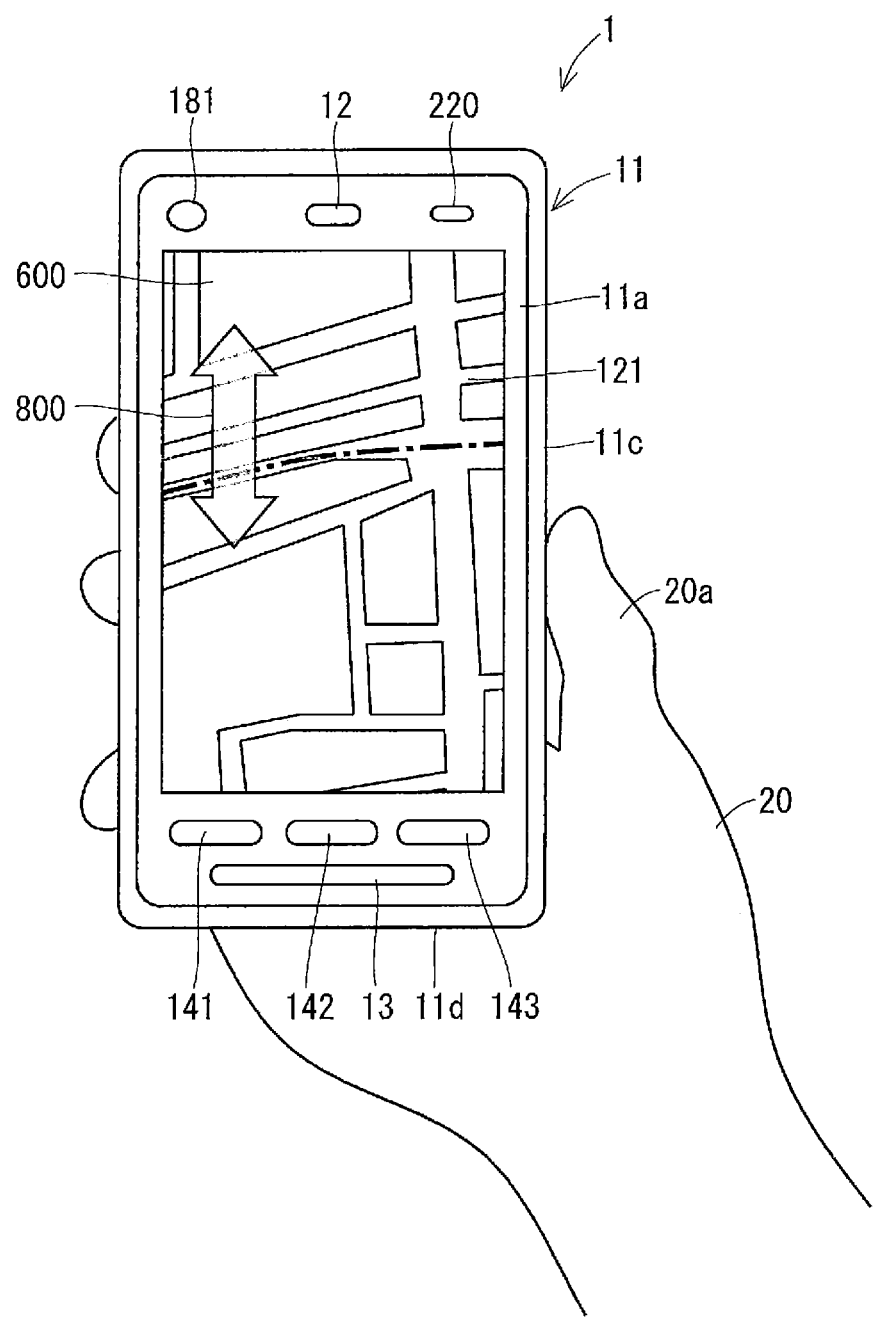
FIG. 33 illustrates a drawing showing one example of a display of the electronic apparatus.

FIGS. 32 and 33 are drawings each showing a display example of second notification information 800. In FIGS. 32 and 33, the second notification information 800 is semi-transparently shown on the map 600. The second notification information 800 in FIGS. 32 and 33 is expressed by an arrow whose length indicates a current scroll speed. The second notification information 800 illustrated in FIGS. 32 and 33 indicates that the scroll speed is larger as the arrow is longer. Thus, the scroll speed is larger in the example in FIG. 32 than that in FIG. 33.

Figure 34:
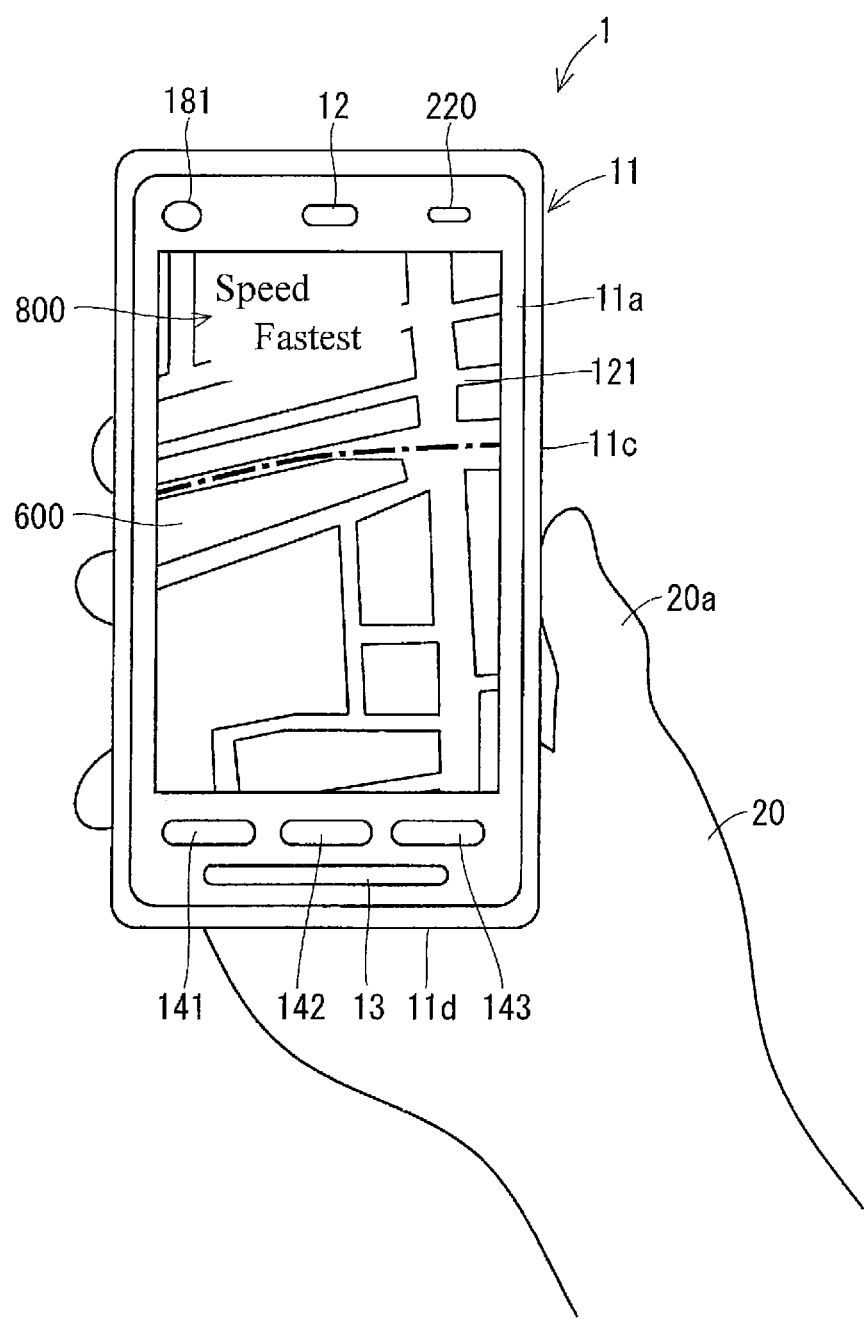
FIG. 34 illustrates a drawing showing one example of a display of the electronic apparatus.
Figure 35:
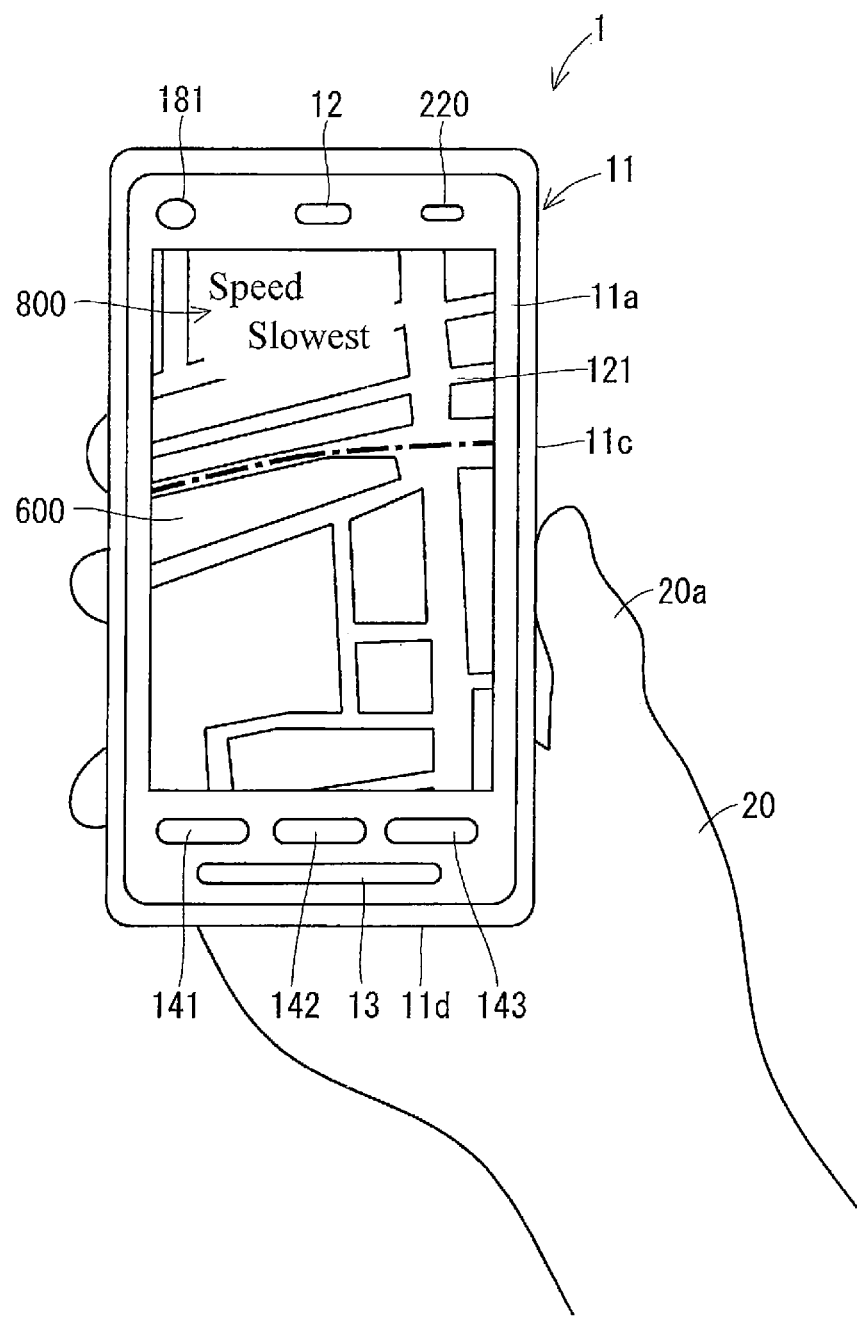
FIG. 35 illustrates a drawing showing one example of a display of the electronic apparatus.

FIGS. 34 and 35 are drawings each showing the other display example of the second notification information 800. In the examples in FIGS. 34 and 35, the second notification information 800 is expressed by characters. Specifically, the second notification information 800 is expressed by English words expressing a current scroll speed. In the example in FIG. 34, the scroll speed is set to have a maximum value, and in the example in FIG. 35, the scroll speed is set to have a minimum value.

Figure 36:
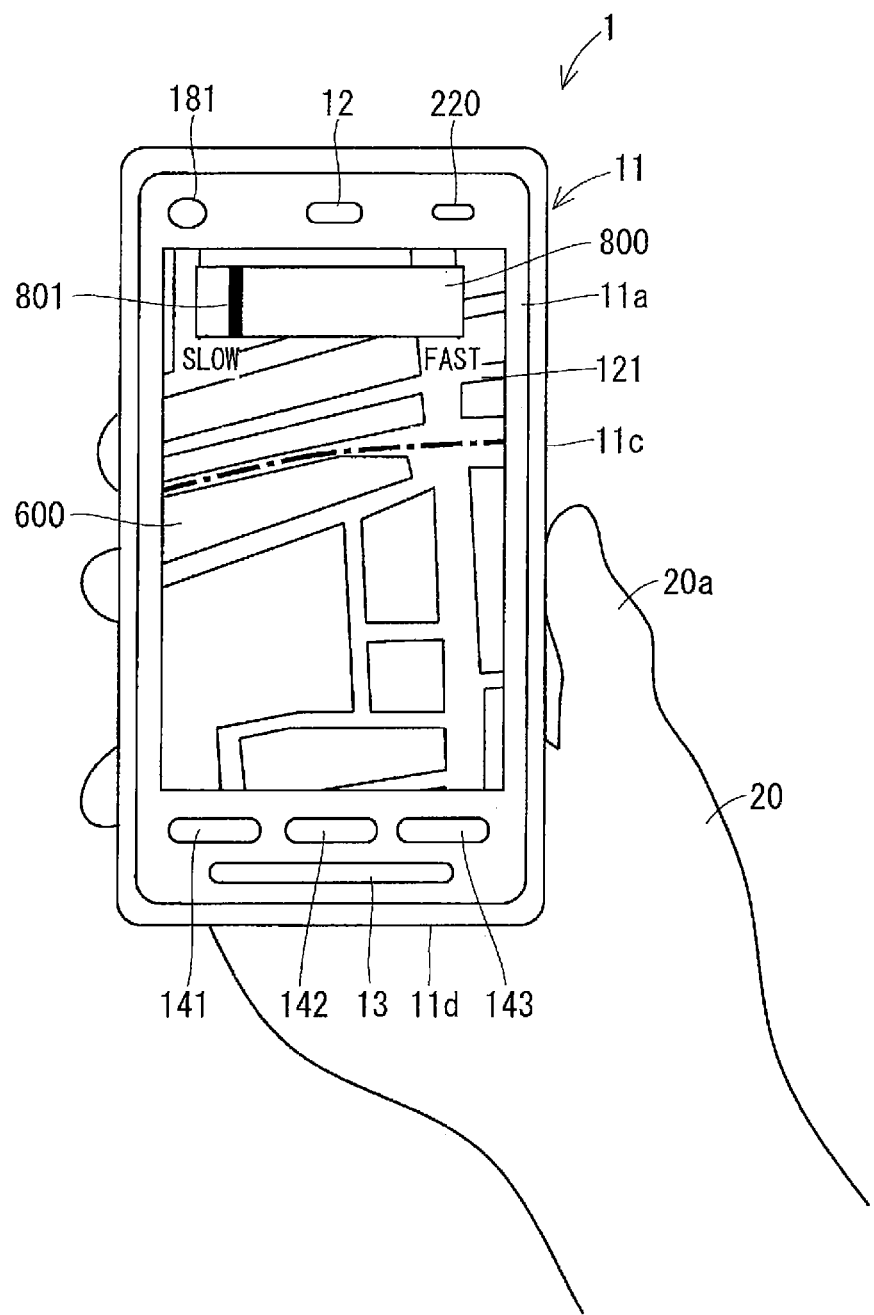
FIG. 36 illustrates a drawing showing one example of a display of the electronic apparatus.

FIGS. 36 and 37 are drawings each showing the other display example of the second notification information 800. In each example in FIGS. 36 and 37, the second notification information 800 is expressed by a speed indicator. In the second notification information 800 in FIGS. 36 and 37, the scroll speed is smaller as a bar 801 is located closer to a left side. Thus, the scroll speed is larger in the example in FIG. 37 than that in FIG. 36.

As described above, the second notification information 800 indicating the current scroll speed is shown in the screen when the display of the screen is scrolled, thus, the convenience of the electronic apparatus 1 is improved. The controller 100 may show the second notification information 800 in the screen when the display of the screen is scrolled also in the case where the scroll speed is changed in accordance with the inclination of the electronic apparatus 1 as illustrated in FIG. 20 described above.

Figure 38:
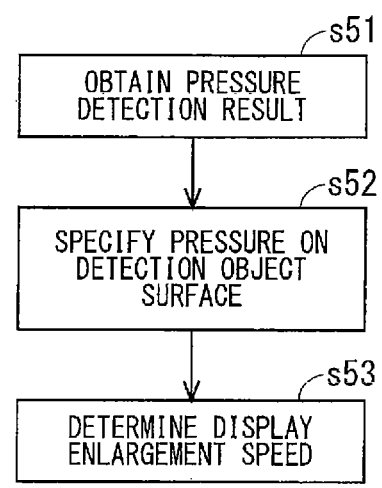
FIG. 38 illustrates a flow chart showing one example of an operation of the electronic apparatus.

When the operation mode is the enlargement mode, the controller 100 may change the display enlargement speed of the screen in accordance with the pressure on the detection object surface 201 specified based on the pressure detection result. FIG. 38 is a flow chart showing an operation example of the electronic apparatus 1 in the case where the controller 100 changes the display enlargement speed in accordance with the pressure on the detection object surface 201. The controller 100 executes a series of processing illustrated in FIG. 38 repeatedly when the controller 100 enlarges the display of the screen.

In the example in FIG. 38, the controller 100 continues to enlarge the display of the screen while the user touches the detection object surface 201 with the finger without moving the finger away from the detection object surface 201 at all in a position of the finger where the slide operation is finished after the slide operation in the upper direction which is the enlargement operation is performed on the detection object surface 201. Then, the controller 100 finishes the display enlargement of the screen when the finger gets away from the detection object surface 201. In the example in FIG.

38, the controller 100 sets the display enlargement speed td an initial value when the controller 100 starts the display enlargement.

When the display of the screen is enlarged, as illustrated in FIG. 38, the controller 100 obtains the pressure detection result from the pressure sensor 230 in Step s51. Next, in Step s52, the controller 100 specifies the pressure on the detection object surface 201 based on the obtained pressure detection result.

Next, in Step s53, the controller 100 determines the enlargement speed based on the specified pressure. Accordingly, the enlargement speed is updated during the display enlargement. In Step s53, the controller 100 sets the first setting value as the enlargement speed when the specified pressure is equal to or smaller than the threshold value, for example. In the meanwhile, the controller 100 sets the second setting value as the enlargement speed when the specified pressure is larger than the threshold value. The second setting value is set to a value larger than the first setting value, for example. The first setting value is set to the same value as the initial value, for example. The controller 100 may set the enlargement speed at three or more levels in accordance with the specified pressure in the manner similar to the case of changing the scroll speed in accordance with the specified pressure.

As described above, the display enlargement speed is changed in accordance with the specified pressure, thus the user can make the electronic apparatus 1 change the display enlargement speed by changing the pressure on the detection object surface 201 at the time of touching the detection object surface 201 with the finger. Thus, the convenience of the electronic apparatus 1 is improved.

The controller 100 may show third notification information indicating a current display enlargement speed in the screen when the controller 100 enlarges the display of the screen. At this time, the controller 100 may show the third notification information semi-transparently in the screen in the manner similar to the second notification information. Alternatively, the controller 100 may show the third notification information in the screen so that a portion below the third notification information in the screen is not seen. The third notification information is displayed in the manner similar to the display example of the second notification information 800 illustrated in FIGS. 32 to 37 described above, for example.

As described above, the third notification information indicating the current display enlargement speed is shown in the screen when the display of the screen is enlarged, thus, the convenience of the electronic apparatus 1 is improved. The controller 100 may show the third notification information in the screen when the display of the screen is enlarged also in the case where the enlargement speed is changed in accordance with the inclination of the electronic apparatus 1 as illustrated in FIG. 25 described above.

The controller 100 may change the speed of the display reduction in accordance with the specified pressure in the similar manner. At this time, the controller 100 may show fourth notification information indicating a current display reduction speed in the screen when the controller 100 reduces the display of the screen. The fourth notification information is displayed in the manner similar to the display example of the second notification information 800 illustrated in FIGS. 32 to 37 described above, for example. Also in the case where controller 100 changes the display reduction speed in accordance with the inclination of the electronic apparatus 1 described above, the controller 100 may show the fourth notification information indicating the current display reduction speed in the screen when the controller 100 reduces the display of the screen.

In each example described above, the controller 100 detects the operation of moving the finger in the upper and lower directions on the detection object surface 201 based on the fingerprint detection result, however, the controller 100 may detect the operation of moving the finger in the direction different from the upper and lower directions on the detection object surface 201. For example, the controller 100 may specify the slide operation in the left direction and the right direction performed on the detection object surface 201 based on the fingerprint detection result. Herein, "the left direction" in "the slide operation in the left direction" indicates a left direction in the case of seeing the detection object surface 201 (in the example in FIG. 3, the direction directed from the back surface 11b toward the front surface 11a of the apparatus case 11). "The right direction" in "the slide operation in the right direction" indicates a right direction in the case of seeing the detection object surface 201 (in the example in FIG. 3, the direction directed from the front surface 11a toward the back surface 11b of the apparatus case 11).

Considered, for example, is a case where the controller 100 can specify the slide operation in the upper direction, the lower direction, the left direction, and the right direction performed on the detection object surface 201. In this case, the controller 100 performs the up-scrolling, for example, when the controller 100 specifies the slide operation in the upper direction performed on the detection object surface 201, and performs the down-scrolling, for example, when the controller 100 specifies the slide operation in the lower direction performed on the detection object surface 201. The controller 100 may reduce the display of the screen, for example, when the controller 100 specifies the slide operation in the left direction performed on the detection object surface 201, and enlarge the display of the screen, for example, when the controller 100 specifies the slide operation in the right direction performed on the detection object surface 201.

Although the electronic apparatus 1 is a mobile phone, such as a smartphone, in the above-mentioned examples, the electronic apparatus 1 may be other types of electronic apparatuses. The electronic apparatus 1 may be a tablet terminal, a personal computer, and a wearable apparatus, for example. The wearable apparatus used as the electronic apparatus 1 may be an apparatus wearable on the wrist, such as a wristband apparatus and a wristwatch apparatus, an apparatus wearable on the head, such as a headband apparatus and an eyeglasses apparatus, and an apparatus wearable on the body, such as a clothing apparatus.

While the electronic apparatus 1 has been described above in detail, the above description is in all aspects illustrative and not restrictive. The various examples described above can be implemented in combination as long as they are not mutually inconsistent. It is understood that numerous examples which have not been exemplified can be devised without departing from the scope of the present disclosure.

What is claimed is:

1. An electronic apparatus, comprising:
    a display;
    a first sensor with a detection object surface configured to detect a fingerprint of a finger touching the detection object surface;
    a second sensor configured to detect a pressure on the detection object surface, wherein the fingerprint and pressure are detected simultaneously based upon the finger touching the detection object surface; and at least one processor configured to specify a first operation performed by the finger on the detection object surface based on a first detection result in the first sensor, specify the pressure based on a second detection result in the second sensor, and control a display of a first screen in the display based on the first operation and the pressure which are specified such that a scroll speed of the first screen is set based on a degree of the specified pressure; and a third sensor configured to detect a first gesture performed by a user, wherein the at least one processor specifies the first gesture based on a third detection result in the third sensor, and controls a display of a second screen in the display surface based on the first operation and the first gesture which are specified, and wherein the at least one processor scrolls the display of the second screen upon specifying the first gesture performed by the user based on the third detection result at a time when the detection object surface is touched with the finger.

2. The electronic apparatus according to claim 1, wherein the at least one processor controls the display to show first information indicating the scroll speed of a current scrolling when the at least one processor controls the display to scroll the first screen.

3. The electronic apparatus according to claim 1, wherein the at least one processor enlarges or reduces the first screen upon specifying a second operation performed by a finger on the detection object surface based on the first detection result, and changes an enlargement speed or a reduction speed of the first screen in accordance with the pressure specified based on the second detection result.

4. The electronic apparatus according to claim 3, wherein the at least one processor controls the display to show second information indicating the speed of a current enlargement or reduction when the at least one processor enlarges or reduces the first screen.

5. The electronic apparatus according to claim 1, further comprising a third sensor configured to detect a second operation performed on the display surface, wherein in a case where a second screen is displayed in the display surface, when the at least one processor specifies a fourth operation performed by a finger for instructing to enlarge or reduce a display of the second screen on the detection object surface based on the first detection result after specifying a third operation for designating a reference point performed on the second screen based on a third detection result in the third sensor, the at least one processor executes processing of enlarging or reducing the display of the second screen, centering on the reference point specified in the third operation.

6. The electronic apparatus according to claim 5, wherein the at least one processor executes the processing so that the reference point designated in the third operation is located in a center of the display surface.

7. The electronic apparatus according to claim 5, wherein the at least one processor controls the display to show, in the second screen, second information indicating that the at least one processor accepts the fourth operation, upon specifying the third operation.

8. The electronic apparatus according to claim 7, wherein the at least one processor controls the display to show the second information in the second screen in a predetermined period of time, accepts the fourth operation when the at least one processor controls the display to show the second information in the second screen, and does not accept the fourth operation when the at least one processor does not control the display to show the second information in the second screen.

9. The electronic apparatus according to claim 5, wherein the at least one processor accepts the third operation when the detection object surface is touched with a finger, and does not accept the third operation when the detection object surface is not touched with a finger.

10. The electronic apparatus according to claim 1, wherein the at least one processor is further configured to:

scroll the display of the second screen by a predetermined amount upon specifying the first gesture at a time when the detection object surface is touched with the finger, and change the predetermined amount in accordance with a fingerprint detected in the first sensor at a time when the first gesture is performed.

11. The electronic apparatus according to claim 1, wherein the at least one processor is further configured to:

scroll the display of the second screen by a first amount upon specifying the first gesture at a time when the detection object surface is touched with the finger, and scroll a display of a third screen by a second amount, which is different from the first amount, upon specifying a second operation performed by a finger on the detection object surface based on the first detection result in a case where the third screen is displayed in the display surface.

12. The electronic apparatus according to claim 1, wherein the at least one processor is further configured to enlarge or reduce the display of the second screen upon specifying a second gesture performed by the user based on the third detection result at a time when the detection object surface is touched with a finger.

13. The electronic apparatus according to claim 12, wherein the at least one processor is further configured to:

enlarge or reduce the display of the second screen by a predetermined magnification ratio upon specifying the second gesture at a time when the detection object surface is touched with the finger, and change the predetermined magnification ratio in accordance with a fingerprint detected in the first sensor at a time when the second gesture is performed.

14. The electronic apparatus according to claim 12, wherein the at least one processor is further configured to:

enlarge or reduce the display of the second screen by a first magnification ratio upon specifying the second gesture at a time when the detection object surface is touched with the finger, and enlarge or reduce a display of a third screen by a second magnification ratio, which is different from the first magnification ratio, upon specifying a third operation performed by a finger on the detection object surface based on the first detection result in a case where the third screen is displayed in the display surface.

15. A non-transitory computer readable storage medium, comprising a control program for controlling an electronic apparatus, wherein the control program makes the electronic apparatus execute:

specifying an operation of a finger performed on a detection object surface based on a first detection result in a first sensor which detects a fingerprint of a finger touching the detection object surface included in the electronic apparatus;

specifying a pressure on the detection object surface based on a second detection result in a second sensor which detects the pressure, wherein the fingerprint and pressure are detected simultaneously based upon the finger touching the detection object surface;

controlling a display of a screen which is a display surface included in the electronic apparatus based on the operation and the pressure which are specified such that a scroll speed of the screen is set based on a degree of the specified pressure;

detecting a first gesture performed by a user using a third sensor;

specifying the first gesture based on a third detection result in the third sensor, and controlling a display of a second screen in the display surface based on the first operation and the first gesture which are specified; and scrolling the display of the second screen upon specifying the first gesture performed by the user based on the third detection result at a time when the detection object surface is touched with the finger.

16. A display control method, comprising:

specifying an operation of a finger performed on a detection object surface based on a first detection result in a first sensor which detects a fingerprint of a finger touching the detection object surface included in an electronic apparatus;

specifying a pressure on the detection object surface based on a second detection result in a second sensor which detects the pressure, wherein the fingerprint and pressure are detected simultaneously based upon the finger touching the detection object surface; and controlling a display of a screen which is a display surface included in the electronic apparatus based on the operation and the pressure which are specified such that a scroll speed of the screen is set based on a degree of the specified pressure;

detecting a first gesture performed by a user using a third sensor;

specifying the first gesture based on a third detection result in the third sensor, and controlling a display of a second screen in the display surface based on the first operation and the first gesture which are specified; and scrolling the display of the second screen upon specifying the first gesture performed by the user based on the third detection result at a time when the detection object surface is touched with the finger.

* * * * *